United States Patent
Hilleli et al.

(10) Patent No.: US 11,983,674 B2
(45) Date of Patent: May 14, 2024

(54) AUTOMATICALLY DETERMINING AND PRESENTING PERSONALIZED ACTION ITEMS FROM AN EVENT

(71) Applicant: MICROSOFT TECHNOLOGY LICENSING, LLC, Redmond, WA (US)

(72) Inventors: Sagi Hilleli, Tel Aviv (IL); Tomer Hermelin, Tel Aviv (IL); Ido Priness, Herzliya (IL); Assaf Avihoo, Tel Aviv (IL); Shlomi Maliah, Herzliya (IL); Eleonora Shtotland, Redmond, WA (US); Tzoof Avny Brosh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 547 days.

(21) Appl. No.: 16/736,522

(22) Filed: Jan. 7, 2020

(65) Prior Publication Data
US 2021/0097502 A1    Apr. 1, 2021

Related U.S. Application Data

(60) Provisional application No. 62/909,060, filed on Oct. 1, 2019.

(51) Int. Cl.
*G06Q 10/1093* (2023.01)
*G06Q 10/109* (2023.01)
(52) U.S. Cl.
CPC ....... *G06Q 10/1095* (2013.01); *G06Q 10/109* (2013.01)
(58) Field of Classification Search
None
See application file for complete search history.

(56) References Cited

U.S. PATENT DOCUMENTS 10,296,187 B1 *   5/2019   Gregg ................. G06F 3/04842
10,728,200 B2 *   7/2020   Miller .................. H04L 51/234
(Continued)

FOREIGN PATENT DOCUMENTS

JP        2008140089 A       6/2008

OTHER PUBLICATIONS

G. Tur et al., "The CALO Meeting Assistant System," in IEEE Transactions on Audio, Speech, and Language Processing, vol. 18, No. 6, pp. 1601-1611, Aug. 2010, doi: 10.1109/TASL.2009.2038810. (Year: 2010).*

(Continued)

*Primary Examiner* — Folashade Anderson
(74) *Attorney, Agent, or Firm* — Shook, Hardy & Bacon L.L.P.

(57) ABSTRACT

Computerized systems are provided for automatically determining action items of an event, such as a meeting. The determined action items may be personalized to a particular user, such as a meeting attendee, and may include contextual information enabling the user to understand the action item. In particular, a personalized action item may be determined based in part from determining and utilizing particular factors in combination with an event dialog, such as an event speaker's language style; user role in an organization; historical patterns in communication; event purpose, name, or location; event participants, or other contextual information. Particular statements are evaluated to determine whether the statement likely is or is not an action item. Contextual information may be determined for action items, which then may be provided to the particular user during or following the event.

20 Claims, 8 Drawing Sheets

(56) References Cited

U.S. PATENT DOCUMENTS

| | | | | |
|---|---|---|---|---|
| 11,062,270 | B2* | 7/2021 | Hilleli | G06N 3/045 |
| 11,568,337 | B2* | 1/2023 | Nandi | G10L 15/26 |
| 11,615,799 | B2* | 3/2023 | Zhu | G06F 16/345 |
| | | | | 704/235 |
| 2006/0271526 | A1* | 11/2006 | Charnock | G06Q 30/02 |
| 2014/0129942 | A1* | 5/2014 | Rathod | H04N 21/44226 |
| | | | | 715/720 |
| 2014/0330558 | A1* | 11/2014 | Dahlmeier | G10L 15/1815 |
| | | | | 704/235 |
| 2015/0149177 | A1* | 5/2015 | Kalns | G10L 15/1822 |
| | | | | 704/257 |
| 2017/0092264 | A1* | 3/2017 | Hakkani-Tur | G10L 15/16 |
| 2017/0161258 | A1* | 6/2017 | Astigarraga | G06F 16/951 |
| 2017/0200093 | A1* | 7/2017 | Motahari Nezhad | |
| | | | | G06Q 10/1095 |
| 2017/0344832 | A1* | 11/2017 | Leung | G06V 20/52 |
| 2019/0050771 | A1* | 2/2019 | Meharwade | G06Q 10/067 |
| 2019/0129749 | A1* | 5/2019 | White | G06Q 10/109 |
| 2019/0130355 | A1* | 5/2019 | Gupta | G10L 15/26 |
| 2020/0074294 | A1* | 3/2020 | Long | G06N 3/0445 |
| 2021/0092222 | A1* | 3/2021 | Kang | H04M 3/42221 |
| 2021/0099317 | A1* | 4/2021 | Hilleli | G06F 40/295 |
| 2022/0303153 | A1* | 9/2022 | Laird-Mcconnell | G06N 20/00 |
| 2023/0033595 | A1* | 2/2023 | Shetty | G06F 40/166 |
| 2023/0267922 | A1* | 8/2023 | Siohan | H04L 12/1831 |
| | | | | 704/205 |
| 2023/0282218 | A1* | 9/2023 | Moynihan | G06F 16/40 |
| | | | | 704/235 |

OTHER PUBLICATIONS

"International Search Report and Written Opinion Issued in PCT Application No. PCT/US20/045685", dated Oct. 15, 2020, 11 Pages.

* cited by examiner

AUTOMATICALLY DETERMINING AND PRESENTING PERSONALIZED ACTION ITEMS FROM AN EVENT

CROSS-REFERENCE TO RELATED APPLICATIONS

This application claims the benefit of U.S. Provisional Application No. 62/909,060, titled "Automatically Determining Personalized Action Items from an Event," filed Oct. 1, 2019, which is hereby expressly incorporated by reference in its entirety.

BACKGROUND

A variety of computer-implemented event or meeting technologies are available to assist users in organizing events. For example, some technologies are configured to receive manual input from users, such as topic of a meeting, date of the meeting, or other notes related to the meeting, and store, in computer memory, the input so that the user can refer back to the information in a graphically displayed format. However, the stored information made available and the functionality of these technologies is limited. Generally, such solutions do not automatically determine and present action items of meetings or other events, among other things. Advances in computing technology and the increased prevalence of modern computing devices has resulted in a dramatic increase in data available regarding events. Conventional solutions have not kept pace with these advances and have failed to capitalize on the available data, or provide robust functionality in order to address these new challenges.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of this disclosure relate to computerized systems for automatically determining whether statements or utterances made during an event (e.g., a meeting) are action items. Manual note taking or manual computer user input and CPU processing for meetings or other events is time consuming and, in many cases, important action items are missed or not recorded. Various aspects of the present disclosure mitigate these deficiencies by determining action items based at least in part on particular factors, such as a speaker's (or user's) language style, user role in an organization, historical patterns in communication, event purpose, event name, event location, names of participants in the event, particular words in a statement, and the like. In some instances, these factors may include or be utilized in combination with one or more models for identifying, extracting, clarifying, and/or attributing action items. Further, some aspects of the present disclosure may compute a probability that a particular statement or set of statements in an event are action items or are not action items.

Existing technologies (e.g., virtual assistants and meeting apps) have various functionality shortcomings, such as requiring tedious and often inaccurate manual user input. Existing technologies are also expensive in terms of computing resource consumption (e.g., memory, network latency, I/O, etc.). Various embodiments of the present disclosure improve these technologies via new functionalities that these existing technologies or computing devices do not now employ, such as automating the determination of an action item based on certain factors or rules (e.g., role of user, meeting type, past meeting history, and the like). Various embodiments of the present disclosure also improve existing technologies by reducing computing resource consumption, such as memory, network latency, I/O, and the like.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Certain aspects of this disclosure automatically determine personalized action items of an event (e.g., a meeting, an interactive workshop, an informal gathering, and the like). The term "action item" as described herein is used broadly and may, for example and without limitation, include a task indicated in the event that is requested or desired to be completed to further a certain goal or purpose, which may be associated with the event. In various instances, an action item may be issued via a command, prompt, or other request by a person to have another person(s) (or themselves) perform some action. In an illustrative example of an action item, during a meeting regarding the development of a certain computer application, a person may say, "Bob, can you perform a round of debugging on the app today," which is an action item for Bob to perform a debugging action today in order to have the application ready for deployment.

Figure 8:
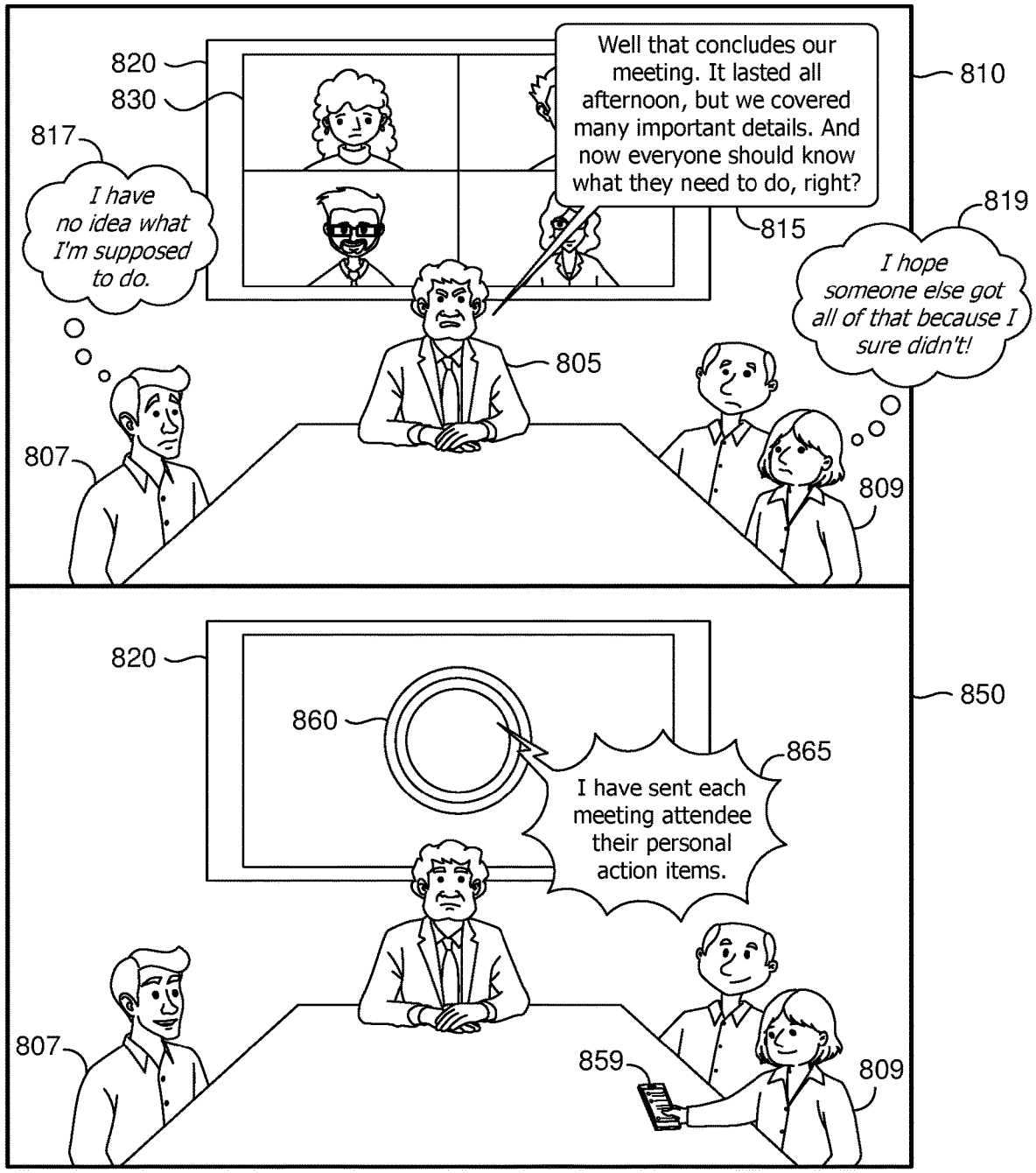
FIG. 8 illustratively depicts an example meeting-event wherein personalized action items are automatically determined for meeting participants, in accordance with an embodiment of this disclosure.

At a high level, an illustrative example use case of one embodiment of the technology described herein is shown in FIG. 8. This example embodiment is utilized for determining personalized action items for participants of a meeting. In particular, FIG. 8 depicts two scenes 810 and 850 of a meeting. The meeting includes meeting attendees physically present at the meeting (e.g., attendees 807, and 809) and meeting attendees attending online (e.g., attendees 830), which are displayed on a computer display 820. In the first scene 810, a manager 805 is shown saying, at statement 815, that the meeting has concluded and that many important details were covered. (Also, it may be inferred from statement 815 that the meeting was long because it lasted all afternoon.) Manager 805 further states, in statement 815, that "now everyone should know what they need to do, right?" In response to this statement by manager 805, other meeting attendees in scene 810 appear worried because they do not know what they need to do. For instance, attendee 807 is shown thinking in thought-bubble 817, "I have no idea what I'm supposed to do," and attendee 809 is shown thinking in thought-bubble 819, "I hope someone else got all of that because I sure didn't."

Ordinarily, these meeting attendees could be in trouble and even may be at risk for losing their job if they missed important action items from the lengthy discussion with the manager 805. The attendees may have taken some notes, but it is often difficult or impossible to actively participate in a discussion while trying to capture important information such as the action items. Using conventional meeting-recording technologies, such as recording or dictation devices, attendees 807 and 809 might be able to go back and listen to the meeting in order to try to figure out the action items. But as further described herein, this task is burdensome and still may result in missing or erroneous action items, because it does not consider other important information such as information about the speaker of an action item, historical information from previous meetings, or other relevant contextual information.

Turning now to scene 850 of FIG. 8, aspects of the example embodiment are depicted. In particular, this example embodiment is implemented using a virtual assistant, such as the Cortana® assistant by Microsoft® Corporation, operating in connection with a meeting or communications application, such as Microsoft Teams®. As shown in scene 850, computer display 820 depicts a representation of a virtual assistant 860, such as the Cortana virtual assistant. The virtual assistant 860 has automatically determined personalized action item for each meeting attendee, based on the meeting discussion and related contextual information, as described herein. Virtual assistant 860 then states, at statement 865, "I have sent each meeting attendee their personal action items." As described herein, each meeting participant (or any individual who is responsible for an action item) may be provided the action item(s) from the meeting for which they are responsible or action items that are relevant to them.

In response to statement 865, meeting attendees (e.g., attendees 807 and 809) appear relieved and less worried. Additionally, attendee 809 is holding a user device 859, which is displaying a list of her action items received from the virtual assistant 860. In this way and as further described below, embodiments of the technologies described herein improve upon conventional meeting-related technologies. (Although this example depicts providing action items to meeting attendees, in some instances, as further described herein, a user who is not attending the meeting, but is responsible for an action item, may be provided an indication of the action item.)

As described in the example of FIG. 8, manual note taking (or manual computer user input and CPU processing for meetings or other events) is burdensome, time consuming and, in many cases, important action items and their context are missed. Action items can be missed for a variety of reasons, such as lack of attentiveness, confusion as to what the action item is, interruptions, non sequiturs, or changing topics during meeting discussion (e.g., while discussing details about an action item, the meeting may be interrupted or unrelated discussion may occur for a moment of time or an extended time interval, before the meeting discussion returns to continue discussing the details), and miscommunication, among other things. There are many different ways people talk and interact with others, which may cause action items to not be identified.

Some aspects of the present disclosure mitigate these problems by determining action items based at least in part on particular factors, such as a speaker's or user's language style, user role in an organization, historical patterns in communication (e.g., in instant chats, email, documents), event purpose, event name, event location, participants in the event, and the like. In some embodiments, one or more of these factors may be utilized in addition to the words of the speaker, in order to determine a likely action item. In this way, embodiments of the technologies described herein improve upon the conventional technologies by being able to determine that a statement or set of statements are action items or are not action items, with a much higher degree of certainty or probability.

For example and as further described herein, some embodiments of the present disclosure can detect (such as via speech recognition functionality) who is speaking in an event, identify that person's user profile, which includes the person's role and other history, identify meeting attributes, and generate a set of one or more likely action items based on this information. For instance, suppose a particular user regularly begins meetings with the statement, "Ok let's get this started." An embodiment of the technologies described herein may recognize the user making this statement from the user's speech, and then determine for instance, using the user's profile, that the particular user makes this statement near the beginning of every meeting, which is indicative of starting the meeting, rather than an action item to be taken. (It is also contemplated that, regardless of the speaker, some embodiments may recognize this statement as an indication of starting the meeting rather than an action item to be taken.) Accordingly, this embodiment can selectively flag or otherwise indicate that this statement is not an action item. (Or as further described herein, may determine a lower likelihood that this statement is an action item.)

In yet another example, suppose during a meeting a particular participant uttered, "we need to remove all outliers before conducting the analysis." In this instance, an embodiment may identify the speaker, determine that the speaker is a managerial software engineer, that the meeting concerns clustering machine learning model techniques, and that similar statements in similar contexts were previously deemed action items in past meetings. Accordingly, this embodiment may determine that the user's statement is an action item based on this information about the speaker, the meeting, and other context. Alternatively, for example, if it is determined that for this same statement, the speaker and those participants in the meeting were sales representatives and the context of their discussion was in humor, then the same statement may be deemed to not be an action item (or may receive a lower probability for being an action item).

As described above, conventional technologies that may be utilized to determine action items in a meeting have various technological and functionality shortcomings. For example, conventional technology may be utilized to record meetings or to capture manual user input, such as a user taking notes on a word processor application. However, these technologies lack functionality to automatically determine action items, and more specifically personalized action items for particular users based on meeting discussions. Furthermore, although speech recognition technology (or speech-to-text technology) could be utilized to capture a transcript of a meeting and then analyzed to identify key words, such as commands, in order to attempt to determine the action items, this approach still would be prone to errors. In particular, as shown by the examples described herein, users often utter statements that may sound like action items, but are not. For instance, statements like "let's get this started" or "I need to leave now to pick up my kids," would be improperly classified as action items under this conventional approach.

Various embodiments of the present disclosure solve these problems and thus improve these existing technologies via new functionalities that these existing technologies or computing devices do not now employ. For example, some embodiments improve existing software technologies by providing functionality that automatically determines action items via certain logic or rules (e.g., role of user, meeting type, past meeting history, user behavior history, user preferences, event location, and the like). As described above, tasks must be manually performed in various existing technologies, and have only been historically performed by humans or manual input of users. In particular embodiments, incorporating these certain logic and rules improves existing technological processes by providing new functionality that effectively performs these tasks automatically and more accurately, which is described in more detail below.

In another example of a functionality shortcoming, some technologies, such as virtual assistants (e.g., smart speakers) fail to automatically determine action items. While these technologies can generally process natural language requests and perform key word recognition, these technologies cannot generally parse a meeting transcript or other data sets to determine which parts of the data set are action items of an event and which parts of the same data set are not action items. Various embodiments improve these virtual assistants because they can parse a meeting transcript or audio input (e.g., in near real-time) to determine what input is an action item.

Existing technologies are also inefficient in terms of computer resource consumption (e.g., CPU, memory, I/O, network latency). For example, existing technologies require entire transcripts of events to be either transmitted over a network to a user device or stored to memory devices so that the user can manually parse out the relevant information within the data. Such transcripts may include input, such as the names of meeting participants, the time of the meeting, the name of the meeting, and all of the meeting content. This can increase storage device I/O (e.g., excess physical read/write head movements on non-volatile disk) or network latency because each time a user inputs these data, components have to repetitively reach out to the storage device to perform read/write operations, which is time consuming, error prone, and can eventually wear on components, such as a read/write head. Additionally, in session or network-based web applications, each user input may require packet generation costs (e.g., input header information) for network protocols (e.g., TCP/IP), which may increase network latency each time the user input is transmitted over a network. Additionally, storing or transmitting entire transcripts of events can consume an unnecessary amount of memory.

Various embodiments of the present disclosure further improve these technologies by improving computing resource consumption of computing devices. For example, some aspects only transmit or store action items of events (and perhaps a small quantity of metadata, such as the name of the meeting). For example, after determining action items, the particular embodiments can transmit the action items (as opposed to the entire meeting transcript), over a computer network to the user device of the user who is the "owner" or party responsible for carrying out the action items. In this way, packet generation costs are reduced because only action items are transmitted over a network, which in some cases allows more bits to be transmitted over the network. In another example, a user interface can be provided, which only includes action items or only action items are recorded, as opposed to entire transcripts of a meeting. In this way, memory storage is optimized and there are fewer I/O operations.

Figure 1:
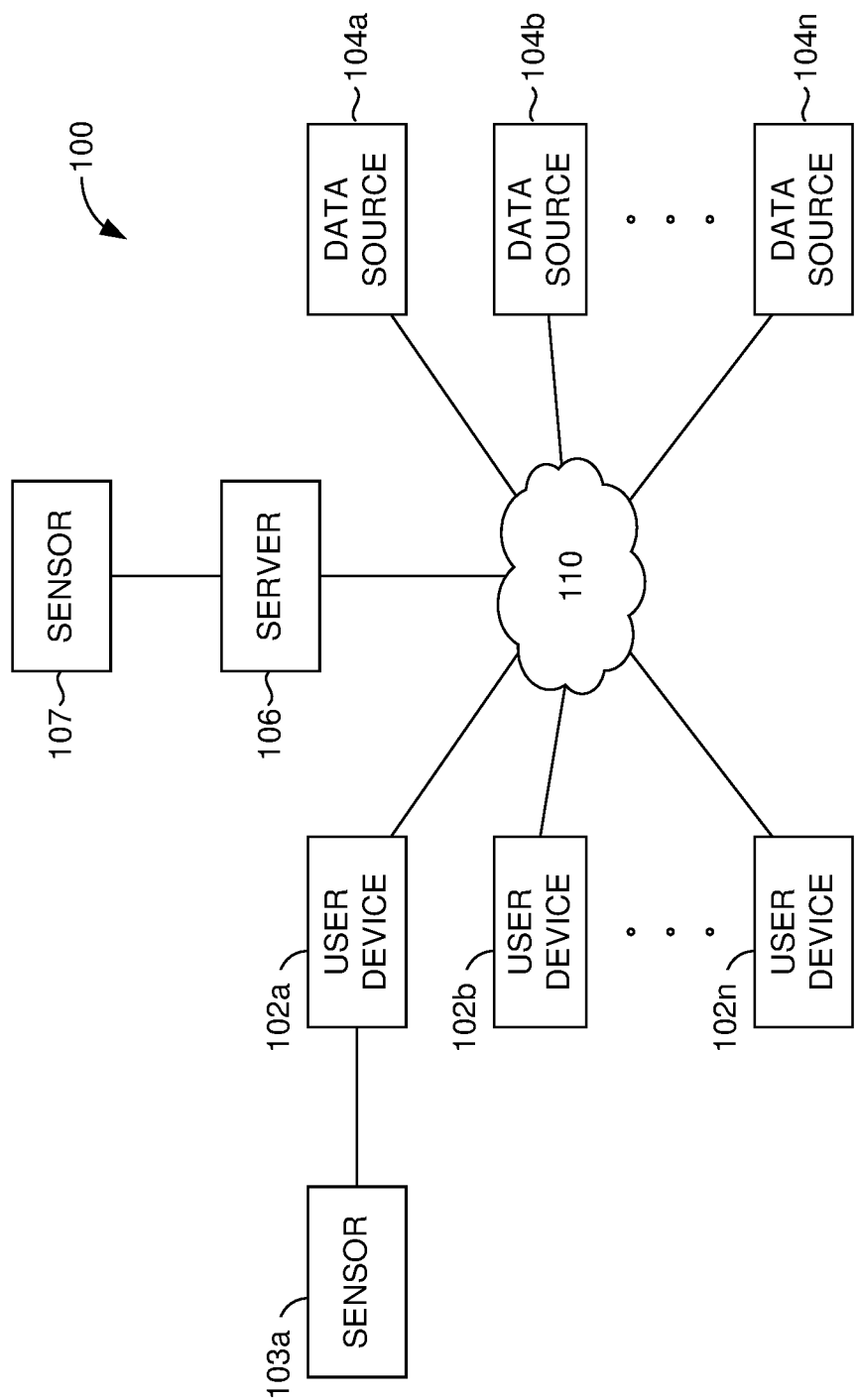
FIG. 1 is a block diagram of an exemplary computing environment suitable for use in implementing some embodiments of this disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; sensors 103*a* and 107; and network 110. It should be understood that operating environment 100 shown in FIG. 1 is an example of one suitable operating environment. Each of the components shown in FIG. 1 may be implemented via any type of computing device, such as computing device 700 described in connection to FIG. 7, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
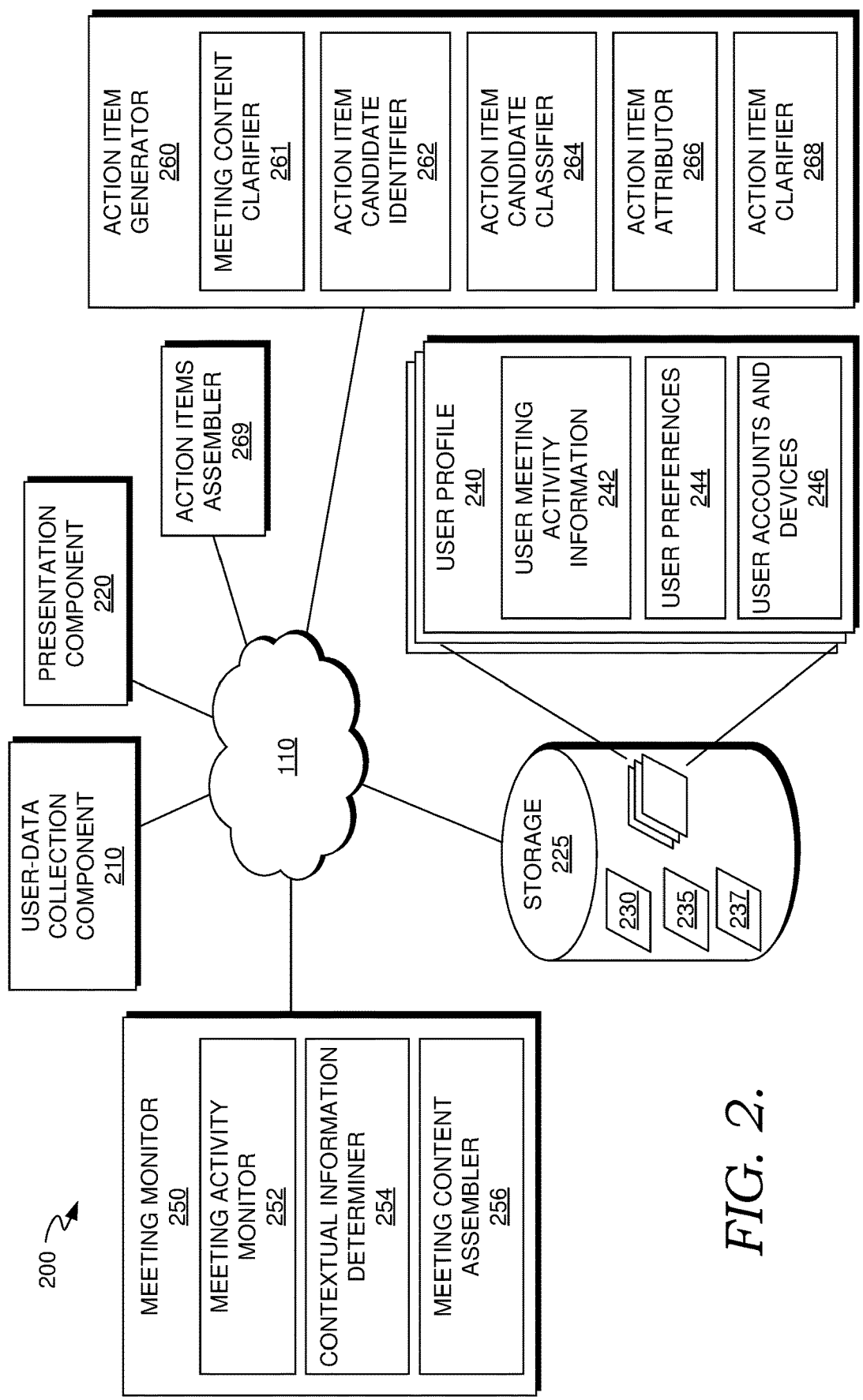
FIG. 2 is a block diagram illustrating an example action item capturing system in which some embodiments of the present disclosure may be employed.

Operating environment 100 can be utilized to implement one or more of the components of the action item capturing system 200, described in FIG. 2, including components for automatic action item extraction. Operating environment 100 also can be utilized for implementing aspects of process flow 600, described in FIG. 6. Referring now to FIG. 2, with FIG. 1, a block diagram is provided showing aspects of an example computing system architecture suitable for implementing an embodiment of the disclosure and designated generally as action item capturing system 200. The action item capturing system 200 represents only one example of a suitable computing system architecture. Other arrangements and elements can be used in addition to or instead of those shown (e.g., as illustrated in the system 300), and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, meeting monitor 250, action item generator 260, action item assembler 269, user profile 240, user-data collection component 210, and presentation component 220. These components may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for the meeting monitor 250 or the action item generator 260. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, GPS data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal could be from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed.

Continuing with FIG. 2, example system 200 includes a meeting monitor 250. Meeting monitor 250 is generally responsible for determining and/or detecting meeting features from online meetings and/or in-person meetings and making the meeting features available to the other components of the system 200. For example, such monitored activity can be meeting location (e.g., as determined by geo-location of user devices), topic of the meeting, invitees of the meeting, whether the meeting is recurring, related deadlines, projects, and the like. In some aspects, meeting monitor 250 determines and provides a set of meeting features (such as described below), for a particular meeting, and for each user associated with the meeting. In some aspects, the meeting may be a past (or historic) meeting or a current meeting. Further, it should be appreciated that the meeting monitor 250 may be responsible for monitoring any number of meetings, for example, each online meeting associated with the system 200. Accordingly, the features corresponding to the online meetings determined by meeting monitor 250 may be used to analyze a plurality of meetings and determine corresponding patterns (e.g., by action item identification logic 230).

In some embodiments, the input into the meeting monitor 250 is sensor data and/or user device data of one or more users at an event and/or contextual information from a meeting invite and/or email or other device activity of users at the meeting. In some embodiments, this includes user data collected by the user-data collection component 210 (which can be accessible via the user profile 240).

The meeting activity monitor 252 monitors user activity via one or more sensors, (e.g., microphones, video), devices, chats, presented content, and the like. In some embodiments, the meeting activity monitor 252 outputs transcripts or activity that happens during a meeting. For example, activity or content may be timestamped or otherwise correlated with meeting transcripts. In an illustrative example, the meeting activity monitor 252 may indicate a clock time at which the meeting begins and ends. In some embodiments, the meeting activity monitor 252 monitors user activity information from multiple user devices associated with the user and/or from cloud-based services associated with the user (such as email, calendars, social media, or similar information sources), and which may include contextual information associated with transcripts or content of an event. For example, an email may detail conversations between two participants that provide context to a meeting transcript by describing details of the meeting, such as purpose of the meeting. The meeting activity monitor 252 may determine current or near-real-time user activity information and may also determine historical user activity information, in some embodiments, which may be determined based on gathering observations of user activity over time and/or accessing user logs of past activity (such as browsing history, for example). Further, in some embodiments, the meeting activity monitor may determine user activity (which may include historical activity) from other similar users (i.e., crowdsourcing).

In embodiments using contextual information related to user devices, a user device may be identified by the meeting activity monitor 252 by detecting and analyzing characteristics of the user device, such as device hardware, software such as OS, network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 246 of user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

The user profile 240 may include learned information about meeting participants or attendees, personal preferences of meeting attendees, and the like. In some embodiments, the user profile 240 contains all or some of the information contained in the user profile 340 of FIG. 3, as described in more detail below. In an illustrative example, the user profile 240 may include user patterns/model 242. This may include indications of when attendees or speakers tend to mention action items (e.g., that is identified via patterns in prior meetings). For example, a particular attendee may always state action items during the last 5 minutes of a meeting. This information can be used to make predictions throughout a meeting to determine whether or not statements are action items. The user profile 240 may also include how attendees or speakers mention action items. For example, historical meeting events may indicate that a particular user always states "let's mark it," after the end of each action item to make sure action items are marked as importance in notes otherwise for completion.

The user profile 240 can include user preferences 244, which generally include user settings or preferences associated with meeting monitor 250. By way of example and not limitation, such settings may include user preferences about specific events (and related information) that the user desires to be explicitly monitored or not monitored or categories of events to be monitored or not monitored, crowdsourcing preferences, such as whether to use crowdsourced information, or whether the user's event information may be shared as crowdsourcing data; preferences about which events consumers may consume the user's event pattern information; and thresholds, and/or notification preferences, as described herein.

In some embodiments, meeting activity monitor 252 monitors user data associated with the user devices and other related information on a user device, across multiple computing devices (e.g., associated with all participants in a meeting), or in the cloud. Information about the user's devices may be determined from the user data made available via user-data collection component 210 and may be provided to the action item generator 260, among other components of system 200, to make predictions of whether character sequences or other content is an action item. In some implementations of meeting activity monitor 252, a user device may be identified by detecting and analyzing characteristics of the user device, such as device hardware, software such as OS, network-related characteristics, user accounts accessed via the device, and similar characteristics, as described above. For example, information about a user device may be determined using functionality of many operating systems to provide information about the hardware, OS version, network connection information, installed application, or the like. Similarly, some embodiments of meeting activity monitor 252, or its subcomponents, may determine a device name or identification (device ID) for each device associated with a user.

The contextual information extractor/determiner 254 determines contextual information about an event. This information may be metadata or other data that is not the actual meeting content or payload itself, but describes related information. For example, contextual information may include who is present or invited to a meeting, the topic of the meeting, whether the meeting is recurring or not recurring, the location of the meeting, the data of the meeting, the relationship between other projects or other meetings, information about invited or actual attendees of the meeting (e.g., company role, whether participants are from the same company, and the like). In some embodiments, the contextual information extractor/determiner 254 determines some or all of the information within the user profile 340 or event profile 370 of FIG. 3, as described in more detail below.

The meeting content assembler 256 receives event content and related contextual information and generates an enriched meeting-activity timeline. In some embodiments, this timeline is a transcript that includes tags and/or other associated content. For example, the timeline can include structured data (e.g., a database) that includes records, where each record includes the timeline of each conversation and a timestamp indicating when the conversation started/stopped. The record can alternatively or additionally include contextual information, such as information about participants of the event or the event itself (e.g., topic of the event, files, slides, or any information in the user profile 240). The enriched meeting-activity timeline can be the output of the meeting monitor 250.

The action item generator 260 identifies likely action items from event content. In some embodiments, the input includes the output of the meeting monitor 250 (e.g., user data and meeting-related data from sensors (microphones, video, user activity, and the like)), the user-data collection component 210, and from user profile 240 of users. In some embodiments, the output is a list of likely action items and related corresponding information, such as relevant files, who the action item is attributed to or who has to complete the action item, the date, and the like. In some embodiments, the output of the action item generator 260 is a structured data record (e.g., a database record) that includes various attributes, such as action item name, attribution (who has to complete the action item), action item category/type, related files, and/or content to be provided to remind the user to complete an action item.

The meeting-content clarifier 261 structures or cleans meeting content (e.g., the transcription and contextual data). For example, a sentence can be tagged with Part-Of-Speech (POS) identifiers, words can be removed, replaced, and added. In some embodiments, the meeting-content clarifier 261 is the same or contains similar functionality to the natural language sequence normalizer 312 of FIG. 3, which is described in more detail below. In an illustrative example, Natural Language Processing (NLP) techniques can be performed to replace certain words or phrases. For instance, the phrase "I am going to expect you to finish project X," can be restructured as "person will finish project X." NLP techniques are described in more detail below.

In some embodiments, the action item candidate identifier 262 can determine candidates based on the syntax or other structure of content (e.g., whether a sentence is a command). In some embodiments, the action item candidate identifier 262 excludes content or action item candidates based on candidates that will likely be finished during the meeting or that are private commands or requests unrelated or are not part of an event. For example, the statement "I will finish talking about X in the next slide," may be excluded as an action item because it is likely to be finished during a meeting. In some embodiments, the action item candidate identifier 262 is the same or contains similar functionality as the action item candidate determiner 321 of FIG. 3, as described in more detail below.

In some embodiments, the action item candidate identifier 262 uses action item identification logic 230 to identify action item candidates. Action item identification logic 230 can include pattern recognition logic. Pattern recognition logic may include rules, associations, conditions, prediction and/or classification models, or pattern inference algorithms. The action item identification logic 230 can take many different forms depending on the particular response activity pattern or the mechanism used to identify a response activity pattern, or identify feature similarity among observed response activity events to determine the pattern that corresponds to performing a task associated with a user command. For example, some embodiments of action item identification logic 230 may employ machine-learning mechanisms to determine feature similarity, or other statistical measures to determine the response activity events belonging to a set of example response actions that support the determined response activity pattern, as further described below. Event activity may be received from the meeting monitor 250 and information about identified similar features may be received from the action item candidate identifier 262.

The action item candidate classifier 264 classifies an action item candidate as either an action item or not an action item. In some embodiments, the action items classifier is the same or includes similar functionality as the classification component 330 of FIG. 3, as described in more detail below. In some embodiments, the action items classifier 264 classifies action items candidates based at least in part on the information retrieved by the meeting monitor 250, and/or the information in the user profile 240. For example, the action items classifier 264 can receive contextual information from the contextual information extractor/determiner 254 that indicates the due date X of action item Y discussed prior to a current meeting. Then during a current meeting, managing participant John Doe may say, "okay, let's start doing Y beginning tomorrow." The action item classifier 264 may then predict that Y is an action item based on the manager being the speaker and prior information that indicated Y being an action item and having a due date.

In some embodiments, the action item candidate classifier 264 uses a machine learning model, such as a deep learning classification neural network (e.g., a Convolutional Neural Network (CNN), Recurrent Neural Network (RNN), or Transformers). In certain embodiments, labels, categories, or target classifications can first be identified, such as "action item" or "not an action item." These labels, categories, or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem. For example, confidence levels obtained to detect action items can be used to detect non-action items. A new dataset is typically similar to original data set used for pre-training. Accordingly, the same weights can be used for extracting the features from the new dataset. In an illustrative example, an original data set may include a statement made by a meeting participant that is classified as an action item. It may also be the case that the participant makes this statement 95% of the time when issuing an action item. Accordingly, via transfer learning and for a new incoming data set, the user may not make this statement. Using the same weights, it can be inferred that the statement is not an action item.

In some embodiments, the action item candidate classifier uses logic 235. Logic 235 may include rules, associations, conditions, prediction and/or classification models, or pattern inference algorithms. Logic 235 can take many different forms depending on the particular response activity pattern or the mechanism used to identify a response activity pattern, or identify feature similarity among observed response activity events to determine the pattern that corresponds to performing a task associated with a user command. For example, some embodiments of logic 235 may employ machine-learning mechanisms to determine feature similarity, or other statistical measures to determine whether or not action item candidates are action items.

The action item attributor 266 determines attribution or to whom action items are attributed. For example, the action item attributor 266 can determine the person responsible for completing the action item and/or the person that stated the action item. In some embodiments, the attribution may be based on information obtained by the meeting monitor 250, information in the user profile 240, and/or classification made by the action items classifier 264. For example, some statements made during meetings or other events are incomplete or otherwise unclear as to the rest of the context. Accordingly, the action item attributor 266 can use this outside contextual information as signals to attribute action items. For instance, a statement in a meeting may be, "okay go do X starting tomorrow." From this statement alone it may be unclear who is talking and who is supposed to be performing X starting tomorrow. However, contextual information obtained from a chat prior to the meeting by the meeting monitor 250 may indicate that Jane Doe was supposed to perform X and that Alexis, her boss, would tell her during the meeting when to complete X. Accordingly, Alexis may be the owner of the action item and thus the action item can be attributed to her.

The action item attributor 266 can map content character sequences to the identity of the speaker or person responsible for completing the action item in any suitable manner. For example, in some embodiments, a voice-recognition component can be used on audio content input to map phonemes of the input to a library of known or predetermined phonemes of particular users (e.g., as found within the participant behavior history 346). Accordingly, a voice-recognition component can record each user's voice in the user profile 240 (e.g., each user that can potentially attend a meeting). In this way, a prediction can be made that a particular parsed character sequence was said by a particular user. Alternatively or additionally, the mapping or association can include a written transcript with a person's name or other identifier next to each character sequence. In an illustrative example, the action item attributor 266 can take as input, a written transcription of a meeting. The sentence, "we need to finish the draft by Friday" may be tokenized to individual words where the subject of the sentence is tagged (e.g., we), the verb of the sentence is tagged (e.g., finish), and the object of the sentence is identified (e.g., draft), as well as semantic context, such as "action item draft to be finished by Friday," as well as indicating that John, the manager said this.

Action item clarifier 268 performs deduplication of action items, consolidates action items, and/or verifies consistency among action items. Deduplication of action items may include removing redundant or repetitively stated action items. For example, the action item, "Get Y done by Friday" may be stated twice in a meeting and so one of the statements may be removed. Verifying consistency and consolidation may include combining differently stated versions of the same office action. For example, a first action item may be "Rex, let's perform project Y." A second action item may state "so yes . . . let's keeping plugging away to get project Y done." These two action items may be consolidated into one action item that is transformed in a manner that is consistent with both statements, such as "Rex will perform project Y." In some embodiments, the action items clarifier uses the dedup logic 237. In some embodiments, word embedding models (e.g., WORD2VEC) or other structures may be used to indicate whether statements are semantically similar (e.g., within a cosign distance). Accordingly, when statements are semantically similar, they can be combined by linearly combining or generating a single sentence (e.g., via NLP) to represent all of the statements.

The action items assembler 269 generates a list of action items and may also provide related information. For example, such related information may be the attributed persons(s), due dates of action items, files, project names, timestamps of different conversations, who is speaking, the owner of the action item, and the like. In some embodiments, the related information may be obtained from the contextual information obtained by the meeting monitor 250.

Example system 200 also includes a presentation component 220 that is generally responsible for presenting content and related information to a user, such as the content related to user feedback. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, associated logical hubs, inferred logical location of the user, and/or other user data, presentation component 220 may determine on which user device(s) content is presented, as well as the context of the presentation, such as how (or in what format and how much content, which can be dependent on the user device or context) it is presented and/or when it is presented. In particular, in some embodiments, presentation component 220 applies content logic to device features, associated logical hubs, inferred logical locations, or sensed user data to determine aspects of content presentation. For instance, clarification and/or feedback request can be presented to a user via presentation component 220.

In some embodiments, presentation component 220 generates user interface features associated with the clarification and/or feedback request. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

In some embodiments, a personal assistant service or application operating in conjunction with presentation component 220 determines when and how (e.g., presenting only action items or action items with metadata, as opposed to an entire meeting transcript) to present the content. In such embodiments, the content, including content logic, may be understood as a recommendation to the presentation component 220 (and/or personal assistant service or application) for when and how to present the notification, which may be overridden by the personal assistant app or presentation component 220.

Figure 3:
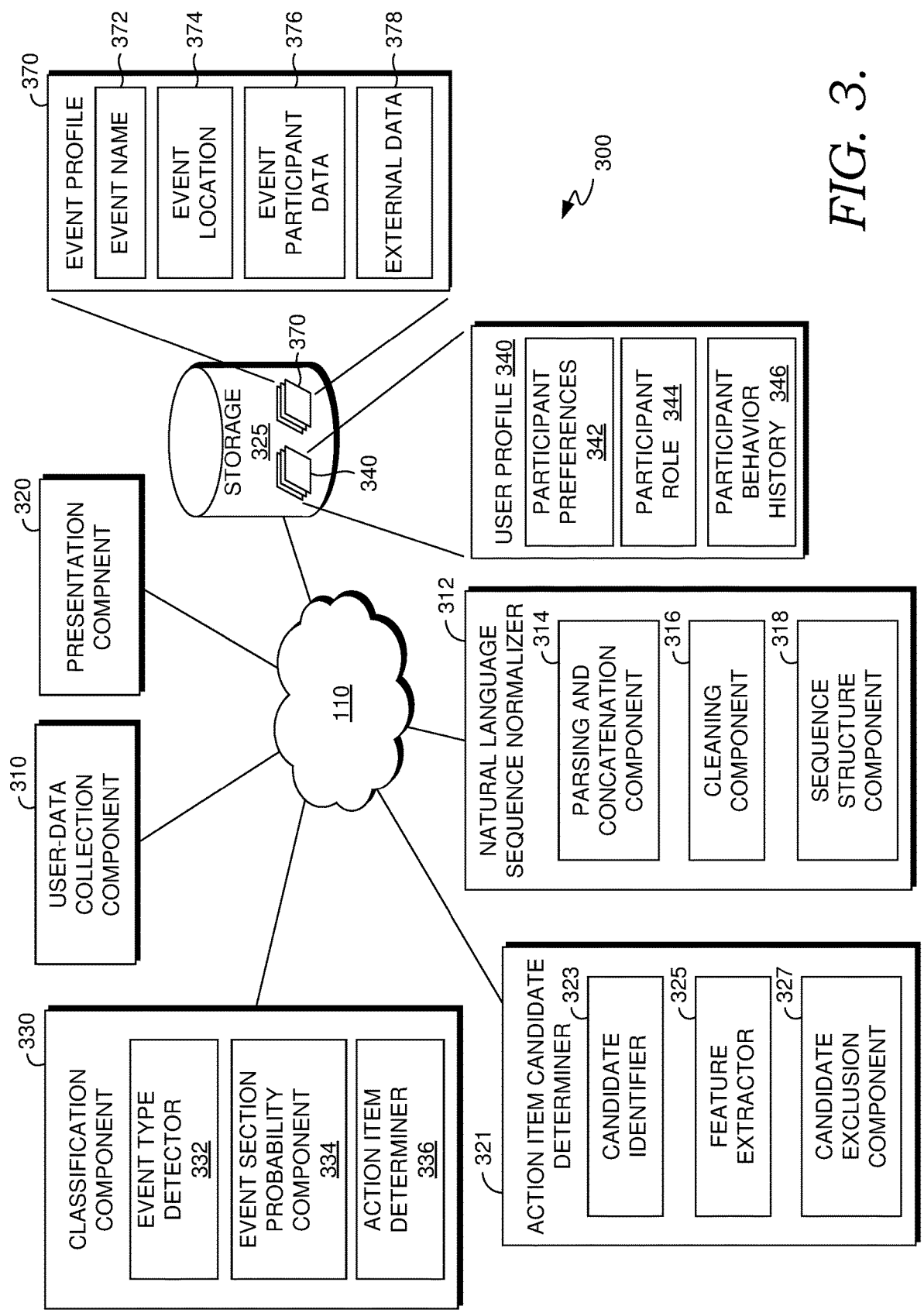
FIG. 3 is a block diagram illustrating an example action item capturing system in which some embodiments of this disclosure may be employed.

Turning now to FIG. 3, the system 300 includes network 110, which is described in connection to FIG. 1, and which communicatively couples components of system 300, including the natural language sequence normalizer 312, the action item candidate determiner 321, the classification component 330, the user-data collection component 310, the presentation component 320, the user profile 340 (through storage 325), and the event profile 370 (through storage 325). As described herein, user features in user profile 340 are generated based on different user signals, such as user preferences, user role (e.g., job title within an organization), and the like. Additionally, signals from event profile 370, and additional user signals may be combined together to generate combined insights or features. As an example, user historical behavior history patterns may be considered in combination with meetings having a specific attendee. The components of system 300 may be embodied as a set of compiled/interpreted computer instructions or functions, program modules, computer software services, or an arrangement of processes carried out on one or more computer systems. In some embodiments, the system 300 is an alternative or additional system embodiment relative to the system 200 of FIG. 2.

It should be understood that the action item capturing system 300 shown in FIG. 3 is an example of one system in which embodiments of the present disclosure may be employed. Some or each component shown may include one or more computing devices similar to the computing device 700 described with reference to FIG. 7. The action item capturing system 300 should not be interpreted as having any dependency or requirement related to any single module/component or combination of modules/components illustrated therein. Each may comprise a single device or multiple devices cooperating in a distributed environment. For instance, the system 300 may comprise multiple devices arranged in a distributed environment that collectively provide the functionality described herein. Additionally, other components not shown may also be included within the network environment. It should be understood that the system 300 and/or its various components may be located anywhere in accordance with various embodiments.

The action item capturing system 300 generally operates to determine the particular content in events that are action items and determines which content character sequences are not action items. The system 300 gathers, organizes, and analyzes data including user preferences, user role, event location, event name, and the like to determine whether content is associated with action items.

User-data collection component 310 is generally responsible for accessing or receiving (and in some cases also identifying) event and user data from one or more data sources, such as data sources 104a and 104b through 104n of FIG. 1. In some embodiments, user-data collection component 310 may be employed to facilitate the accumulation of event/meeting data of all users of the system 300 (including crowd-sourced data). The data may be received (or accessed), and optionally accumulated, reformatted, and/or combined, by user-data collection component 310 and stored in one or more data stores such as storage 325, where it may be available to other components of the calendar item enrichment system 300. Further, the user-data collection component 310 may be configured to associate each of the event data elements with one or more user profiles and to store the associated calendar event data elements in a corresponding user profile 340.

Example system 300 also includes storage 325. Storage 325 generally stores information including data, computer instructions (e.g., software program instructions, routines, or services), and/or models (e.g., machine learning models) used in embodiments of the technologies described herein. In an embodiment, storage 325 comprises a data store (or computer data memory). Further, although depicted as a single data store component, storage 325 may be embodied as one or more data stores or may be in the cloud.

Event and user data may be received from a variety of sources where the data may be available in a variety of formats. For example, in some embodiments, event and user data received via user-data collection component 310 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as event and user data from a data source 104a, and may be embodied as hardware, software, or both. By way of example and not limitation, event and user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user-data associated with events; etc.) including user activity that occurs over more than one user device, user history, session logs, application data, contacts data, calendar and schedule data, notification data, social-network data, news (including popular or trending items on search engines or social networks), home-sensor data, appliance data, GPS data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein. In some respects, calendar event data may be provided in user signals. A user signal can be a feed of event data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

The natural language sequence normalizer 312 parses or tokenizes event content and/or other external information (e.g., information received by the user-data collection component 310) and re-structures the information. In some embodiments, the event content is or includes documents or transcripts of the order and content of everything that was said in an event written in natural language. For example, the event content can be a written transcript of everything that was said during an entire duration of a meeting. In some embodiments, the event content can alternatively or additionally include audio content of everything that was said during an event. In some embodiments, the natural language sequence normalizer 312 processes event content in near-real time (e.g., as each statement is stated during a meeting or shortly thereafter each statement is stated). Alternatively or additionally, in some embodiments, the natural language sequence normalizer 312 processes event content after each event or meeting has concluded.

The parsing and concatenation component 314 tokenizes and breaks character sequences (e.g., sentences, words) from the content and joins other character sequences (e.g., semantically similar words) and/or tags (e.g., part-of-speech) to the tokenized character sequences. In some embodiments, the joined character sequences are a part of an NLP component or library where each content is parsed into its words and some or each of the words are tagged with a part-of-speech identifier.

"Tokenization" or parsing in various embodiments corresponds to a computer-implemented process that segments the content into words, sentences, symbols, character sequence, and/or other elements of the content. "Syntax" or syntactic properties refers to the structure of character sequences of the content (as opposed to the semantics or meaning), such as the structure of a sentence. This can include a set of rules for analyzing a message, such as word and/or POS order. For example, for the sentence "the girl jumped happily," the syntax may correspond to a word order where the structure is subject-verb-adverb (or subject, verb, object, etc.). In various embodiments, the POS of a message element is tagged.

In some embodiments, NLP derives semantic and syntactic content of semi-structured or unstructured data (e.g., data in image files, data in blogs, posts, websites, text descriptions of classifier models). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like), and/or the context of surrounding words. Other syntactic and semantic elements are also possible.

The cleaning component 316 removes redundant or duplicated character sequences from the content. This takes into account meeting participants who stutter, stammer, mumble, accidentally say the same things, or otherwise provide redundant or repetitive data. For example, a meeting participant may say, "I will . . . [pause because someone interjects] . . . . Ok I will send the mmm file." In this example, the cleaning component 316 may remove the "I will" phrase from the character sequence because it is redundant (e.g., it has already been stated).

The sequence structure component 318 replaces, removes, and/or adds words or sets of words to character sequences in the content to make the content easier for processing. In some embodiments, this component uses semantic and syntactic analysis described above with respect to NLP. Alternatively or additionally, in some embodiments this component uses word embedding models (e.g., WORD2VEC, GloVe, and the like) to determine semantically similar words. In some embodiments, the mapping of character sequences of the content to meeting participants as described above can further be used to add or replace words via the sequence structure component 318. For example, the sequence structure component 318 can modify the phrase "I'm going to make sure you aren't blocked," to "[person] [will] make sure that [person] [is not] blocked." Accordingly, the sequence structure component 318 can determine that "I'm going to" is semantically similar to "I will" and that "aren't" is semantically similar to "is not" and make the corresponding replacements. Moreover, the sequence structure component 318 can determine that a "person" is speaking or is the subject and/or object of the sentence.

The action item candidate determiner 321 determines which portions of the content are candidates to become action items. In some embodiments, this occurs after or in response to the processing by the natural language sequence normalizer 312. The candidate identifier 323 identifies patterns or syntactic relationships in character sequences in content to define the boundaries or cutoffs for action items. For example, using the illustration above, after the natural language sequence normalizer determines a character sequence to be "person will make sure that person is not blocked," it can be identified by the candidate identifier as a candidate for further processing. In some embodiments, the candidate identifier 323 identifies linguistic or natural breaks in the content, such as periods, semi-colons, when commands are issued, and the like to determine that the content between these characters or commands are candidates for further processing. For example, if event content had a total of 4 sentences, and 3 of the 4 sentences were commands, the candidate identifier 323 identifies the 3 sentence commands as individual action item candidates for further processing.

The feature extractor 325 extracts feature values associated with the content in preparation for prediction or classification (e.g., as collected by the user-data collection component 310). For example, for each action item candidate, the feature extractor 325 can extract who is speaking, all of the people or participants in the meeting (e.g., the event participant data 376), the participant role 344 of all the participants in the meeting, the event name 372, participant preferences 342 for all the participants in the meeting, participant behavior history 346 for all the participants in the meeting, event location 374, and external data 378. Participant preferences 342 correspond to personal preferences of one or more participants and can be used to determine whether candidate action items are indeed action items, set due dates for action items, deliver action items to the user, and the like. Such personal preferences may be or include, for example: a particular user-selected communication channel (e.g., SMS text, instant chat, email, video, and the like) for action items to be transmitted through. Additionally or alternatively, personal preferences can include recreational, hobby, or other interests. For example, if it is known that a meeting participant likes car make X of model Y, any mention of this by the participant in an event may be weighted to less likely to be an action item. In another example, a participant may have specific event preferences, such as preferring that each action item being completed within a window of time. Accordingly, for example, when an action item is predicted or transmitted, additional data, such as the time to complete the action item can also be coupled with the action item based on the participant preferences 342.

Participant role 344 corresponds to event participant title or other ID. For example, participant role 344 can be or include one or more job titles of a participant, such as software engineer, marketing director, CEO, CIO, managing software engineer, deputy general counsel, vice president of internal affairs, and the like. In some embodiments, the user profile 340 includes participant roles of each participant in an event. Participant role 344 can be used as a signal to help determine whether an action item candidate is indeed an action item. This is because certain statements are more likely or less likely to be action items depending on the role of the participant who made the statement. For example, the statement "we should create a different design for this customer" may be an action item if it is mentioned by a senior or managerial engineer, whereas it would not necessarily be an action item if a new employee made the same statement because typical employment structures require action items to either be stated by authority figures or be approved by authority figures.

Participant behavior history 346 corresponds to identified patterns of historical behavior of one or more participants of an event. Such patterns may be or include: patterns in the way participants talk (e.g., participant A always makes jokes even when issuing a command, making it less likely that a candidate is an action item), tendency to mention action items at a specific time or time window of an event, pattern of never being the owner of or issuing any action items, pattern of always being the owner of or issuing action items, patterns in the way people phrase action items or interact with others (e.g., person A who is a manager always says, "homework assignment number [x] . . . " before an action item is a signal that a sentence thereafter is an action item), user's language and style, conversation history as previous communication (e.g., chats, e-mails, and documents) between participants, and the like. Historical patterns can be used to predict whether candidate action items are indeed action items. For example, if the conversation history between two participants revealed that the next upcoming meeting Y would be where they decided a location for an upcoming event Z, the phrase "Ok John, let's have it at Glendale" during meeting Y may be determined to be an action item based at least in part on the conversation history regarding the event and event location. In some embodiments, the patterns identified as the participant behavior history 346 are determined by one or more machine learning models (e.g., Bayesian graphs, random forest, linear regression, and the like).

In some embodiments, the user profile 340 includes alternative or additional information, such as age of participants, family members of participants and associated information, address of participants, and the like that are used to help determine whether candidate action items are indeed action items. For example, if it is known that speaker A has a kid Jane Doe in school, and speaker A says "I have to pick up Jane Doe today," this may selectively not be chosen to be an action item based on the family member data.

Event profile 370 corresponds to events, such as meetings, and associated details (e.g., as collected by the user-data collection component 310). Event name 372 corresponds to the title or topic (or sub-topic) of an event. Action items can be determined based at least in part on the event name 372. This is because for certain events and the associated subject matter, certain phrases or statements are more or less likely to be action items. For example, for a meeting where the topic is the accuracy of a machine learning model, any statements concerning model details, such as providing more test data, reducing error rate, and the like, are more likely to be action items than, for instance, a meeting where the topic is sales tactics based on hand gestures and other body language habits.

Event location 374 corresponds to the geographical location or type of event. For example, event location 374 can indicate the physical address of the meeting or building/room identifier of the meeting location. The event location 374 can alternatively or additionally indicate that the meeting is a virtual or online meeting or in-person meeting. The event location 374 can also be a signal for determining whether a candidate action item is indeed an action item. This is because certain event locations are associated with certain topics and content of an event is less or more likely to be considered an action item based at least in part on the location or topic. For example, if it is determined that the meeting is at building B, which is a building where engineering testing occurs, certain statements are more likely to be action items than others, such as those statements that are commands for testing, building, and the like.

Event participant data 376 indicates the names or other identifiers of participants at a particular event. In some embodiments, the event participant data 376 includes the relationship between users at an event. For example, the event participant data 376 can include a graphical view or hierarchical tree structure that indicates the most managerial position at the top or root, with an intermediate-level manager at the branches just under the managerial position, and a senior worker at the leaf level under the intermediate-level manager. In some embodiments, the names or other identifiers of participants of an event are determined automatically or in near-real-time as users speak (e.g., based on voice recognition algorithms) or can be determined based on manual input of the attendees, invitees, or administrators of a meeting. In some embodiments, in response to determining the event participant data 376, the system 300 then retrieves or generates a user profile (e.g., the user profile 340) for each participant of an event.

External data 378 corresponds to any other suitable information that can be used to make predictions of whether content is an action item or not that is not the actual meeting content itself. In some embodiments, external data 378 includes any non-personalized data that can still be used to make predictions. For example, external data 378 can include learned information of human habits over several meetings/events even though the current participant pool for a current event is different than the participant pool that attended the historical events. This information can be obtained via remote sources such as blogs, social media platforms, or other data sources unrelated to a current event. In an illustrative example, it can be determined over time that for a particular organization or business unit, action events are always listed at the last 10 minutes of a meeting. Accordingly, for the last 10 minutes of a current meeting whose particular participant pool has never met before, a candidate is more likely to be predicted as an action item based on the history of the particular organization or business unit.

The candidate exclusion component 327 excludes or removes action item candidates from being labeled as action items. In some embodiments, this exclusion is based on the candidates likely to be completed during the event or explicitly removed as an action item. For example, if a participant states, "I will explain it in the next slide," this is a signal to the system 200 that this candidate is not a true action item, as the candidate will be completed sometime during the meeting. Or a participant may say, "thanks for all the input everyone . . . after further thinking, let's not do Y." Thus Y may be removed as an action item. Accordingly, embodiments of the system 300 may use a set of rules indicating that an action item candidate is an action item only if the item to be completed is still going to occur at some time after the end of the meeting. In some embodiments, this exclusion is based on candidates that, while they appear to be action items, are unrelated or not important for a particular event. For example, a meeting participant may say "Jake, can you pick up Robert today?" However, the meeting may be about sales or other unrelated subject matter and the speaker (e.g., Dan) may have a son Robert that needs to be picked up.

The classification component 330 classifies or otherwise makes a prediction corresponding to whether action item candidates are actual action items. Such component can use any suitable model or set of models or technique to make predictions, such as random forest models, deep neural networks, Bayesian networks, or any other suitable machine learning model. In some embodiments, where the model is supervised, for example, the labels or classification targets are whether a candidate is an action item or not. For example, in random forest embodiments, each leaf node may indicate whether a candidate is an action item or not, which is based on the decision at the branch and root nodes (e.g., based on the extracted values within the user profile 340 and the event profile 370).

The event type detector 332 detects or classifies a written or audio transcript according to the type of meeting. For example, the event type detector 332 can classify whether the event is a broadcast meeting, a tutorial, a board meeting, and the like (e.g., based on the information in the event profile 370). Alternatively or additionally, the event type detector 332 also computes the probability that action items will exist within content based at least in part on the type of event and/or other information within the event profile 370. In some embodiments, this probability is used to determine additional probabilities to indicate whether specific candidates are indeed action items. For example, if it was determined that an event is a tutorial or speaking engagement with little to no feedback or dialog between speaker and attendees, there may be a prediction that there is a low probability (e.g., low confidence level) that an event will contain action items. Accordingly, anything specifically stated or said during the event might automatically be weighted or otherwise scored toward low probability.

In some embodiments, the event type detector 332 uses a Naïve-Bayes or other Bayesian network model to make its predictions. Naïve-Bayes algorithms are a set of probabilistic algorithms that use probability theory and Bayes' Theorem to predict the tag of a text. For example, if the event name 372 does not automatically provide the name or topic of a meeting, the event type detector 332 may use Naïve-Bayes algorithms to infer or predict the topic or name of an event. In an illustrative example, the statement "let's do more rounds of tracing and debugging" may be tagged with "software performance engineering" or the like. A Bayesian network graph maps the relationships between nodes (e.g., events) in terms of probability. These graphs show how the occurrence of particular events influences the probability of other events occurring. Each node is also conditionally independent of its non-descendants. These graphs follow the underlying principle of Bayes' theorem, represented as:

$$P(A|B) = \frac{P(B|A)P(A)}{P(B)}, \quad \text{Equation 1}$$

where A and B are events and $P(B) \neq 0$. That is, the probability (P) of A given B=the probability of B given A multiplied by the probability of (A) all over the probability of B. The directed acyclic graph includes various nodes, directed edges, and conditional probability tables. For example, each node may represent a feature within the event profile 370, such that the probabilities are interdependent, such as because there is a high probability that the even location is at X, there is a probability Y that the topic or event name 372 of the event is Z, and because of probability Y, there is probability T that participants 1, 2, and 3 will be at the meeting.

The event section probability component 334 classifies sections (e.g., action item candidates, paragraphs, sentences, pages, and the like) of content as concrete (high probability that the section is an action item) or descriptive (low probability that the section is an action item). The event section probability component 334 thus parses content and maps, in memory, the sections as likely or not likely to be action items (e.g., based on syntax structure). For example, sentences or phrases without any commands or requests (e.g., sentences that are not imperative sentences), such as "item X was great for our customers," or "we had lots of fun at the last meeting," or "we made lots of progress since the last meeting," have a low probability of being action items. Conversely, sentences or phrases that are imperative sentences or otherwise include commands or requests are more likely to be action items. An imperative sentence is used to issue a command, make a request, or offer advice. Imperative sentences typically end in a period or exclamation point or have other syntactic properties, such as a subject, followed by a verb, then an object (e.g., "John [subject], please join [verb] in on the project [object]"). In some embodiments, the event section probability component 334 can discern between action items and those that appear to be action items but are not based, for example, on syntactic properties and or history (e.g., the participant behavior history). For example, the statement, "you can press on it," may be tagged as not an action item based on a dictionary or other data structure that lists colloquial terms or phrases that are sayings, as opposed to action items.

In some embodiments, the event section probability component 334 uses prediction models, such as a Hidden Markov Model (HMM). An HMM is a computing tool for representing probability distributions over sequences of observations. These tools model time series data. HMMs augment the Markov chain. The Markov chain is a model that provides insight about the probabilities of sequences of random variables, or states, each of which take on values from a set of data. These data sets can be words, tags, symbols, or the like. The assumption with Markov chains is that any prediction is based only on the current state, as opposed to states before the current state. States before the current state have no impact on the future state. In various cases, events of interest are hidden in that they cannot be observed directly. For example, POS tags are typically not observed in a text. Rather, words themselves are directly observed, and POS tags (the hidden state) are inferred.

An HMM allows the model to use both observed events and hidden events that are essentially causal factors in a probability algorithm. An HMM is represented by the following components: a set of N states $Q=q_1 q_2 \ldots q_N$, a transition probability matrix $AA=a_{11} \ldots a_{ij} \ldots a_{NN}$, each $a_{ij}$ representing the probability of moving from state i to state j, s.t. $\Sigma_{j=1} a_{ij}=1 \ \forall i$, a sequence of T observations $O=o_1 o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation $o_t$ being generated from a state i and an initial probability distribution $\pi=\pi_1 \pi_2 \ldots \pi_N$ over states.

$\pi_i$ is the probability that the Markov chain will start in state i. Some states j may have $\pi_j=0$, meaning that they cannot be initial states.

The probability of a particular state depends only on the previous state, thus introducing the Markov Assumption: $P(q_i|q_1 \ldots q_{i-1})=P(q_i|q_{i-1})$. The probability of an output observation $o_i$ depends only on the state that produced the observation $q_i$ and not on any other states or any other observations, thus leading to output independence $O(o_i|q_1 \ldots q_i \ldots, qr, o_1, \ldots, o_i, \ldots o_T)=P(o_i|q_i)$. This allows a component to state that given observations o (e.g., a sentence was in the form of a command, the type of meeting, or any other value within the event profile 370), the algorithm can find the hidden sequence of Q states (e.g., whether or not a portion of content was likely an action item or not).

In some embodiments, the action item determiner 336 takes, as input, all the calculated features obtained by the feature extractor 325, the results of candidate identifier 323 action item candidates (e.g., determined by the action item candidate determiner 321), and/or other character sequences or context and classifies or otherwise makes a prediction whether each candidate action item is an action item or is not an action item. In some embodiments, "context" as described herein is the surrounding text of a particular character sequence. For example, a context of a first sentence can be a second sentence that is before the first sentence and a third sentence after the first sentence.

In an illustrative example of how the action item determiner 336 makes predictions, first the natural language sequence normalizer 312 can take as input an entire transcript to restructure the transcript as described above. Responsively, the action item candidate determiner 321 can identify candidate action items based on sentence syntax, exclusion rules, and/or can extract various features from the user profile 340 and the event profile 370 as described above. Responsively, the classification component 330 can classify the event (e.g., via Naïve-Bayes), determine the probability that sections or action item candidates in the transcript are action items or not (e.g., via an HMM), and then finally classify whether a candidate action item is indeed an action item. For example, the action item determiner 336 can determine whether or not a candidate is an action item with a certain level of confidence based at least in part on the participant behavior history 346, the participant role 344, and the participant preferences 342 of each participant in a particular meeting. The action item determiner 336 can additionally or alternatively determine whether or not a candidate is an action item based at least in part on the event name 372, the event location 374, the event participant data 376, and/or the external data 378.

In some embodiments, the action item determiner 336 uses a machine learning model, such as a deep learning classification neural network (e.g., a CNN). With CNNs, labels, categories, or target classifications can first be identified, such as "action item" or "not an action item." The neural network can include a convolutional layer, a pooling layer, and a fully connected layer. The machine learning model neural network may be fed or receive as input the output provided by the natural language sequence normalizer 312, the action item candidate determiner 321, and/or the event type detector 332/event section probability component 334 at the convolutional layer. Each input can be transformed into a 2-D input vector array of values, such as integers of ones and zeroes. Each value represents or describes a particular value of the input and the value's intensity. For instance, a word or character sequence can be denoted with a one, and other words or character sequences can be denoted with zeroes. The convolutional layer utilizes one or more filter maps, which each represent a feature (e.g., participant role 344) of the input. There may be various features of the input, and thus there may be various linearly stacked filter maps for a given input. A filter map is also an array of values that represent sets of values and weights where a value is weighted higher when it matches a corresponding value (e.g., training data that indicates participant behavior history 346) or set of values in the corresponding section of the input. The convolution layer includes an algorithm that uses each filter map to scan or analyze each portion of the input. Accordingly, each value of each filter map is compared and matched up against a corresponding value in each section of the input and weighted according to similarity. In some embodiments, the convolutional layer performs linear functions or operations to arrive at the filter map by multiplying each value with its own value and then performing a summation function of each product, which is then divided by the total quantity of values in the input feature.

In particular embodiments, the pooling layer reduces the dimensionality or compresses each feature map by picking a window size (i.e., a quantity of dimensional values that will be analyzed in the feature map) and selecting the maximum value of all of the values in the feature map as the only output for the modified feature map. In some embodiments, the fully connected layer maps or votes for each value of each modified feature to each classification (i.e., whether or not the candidate is an "action item" or "not an action item"). The vote strength of each value is based on its weight or value score. The output is a score (e.g., a floating point value, where 1 is a 100% match) that indicates the probability that a given input or set of modified features fits within a particular defined class (is an "action item" or "not an action item"). For example, an input may include a set of text that states, "let's get this meeting started after I tell a joke . . . . Jake tell John to finish the product by Monday." The classification types may be "action item" or "not an action item." After the first character sequence "let's get this meeting started after I tell a joke . . . " is fed through each of the layers, the output may include a floating point value score for each damage classification type that indicates "action item: 0.21," and "not an action item: 0.90," which indicates that this character sequence has a 90% probability of not being an action item. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen over time as more training inputs and baseline data sets are fed into the learning models so that classification can occur with higher prediction probabilities.

The presentation component 320 functions to render various interfaces and various other outputs generated by the calendar item enrichment system 300 and the components thereof in a format that can be displayed on user devices. By way of example, the presentation component 320 may render an interface of action item events (as opposed to an entire event content) to those appropriate individuals who own the action items.

Figure 4:
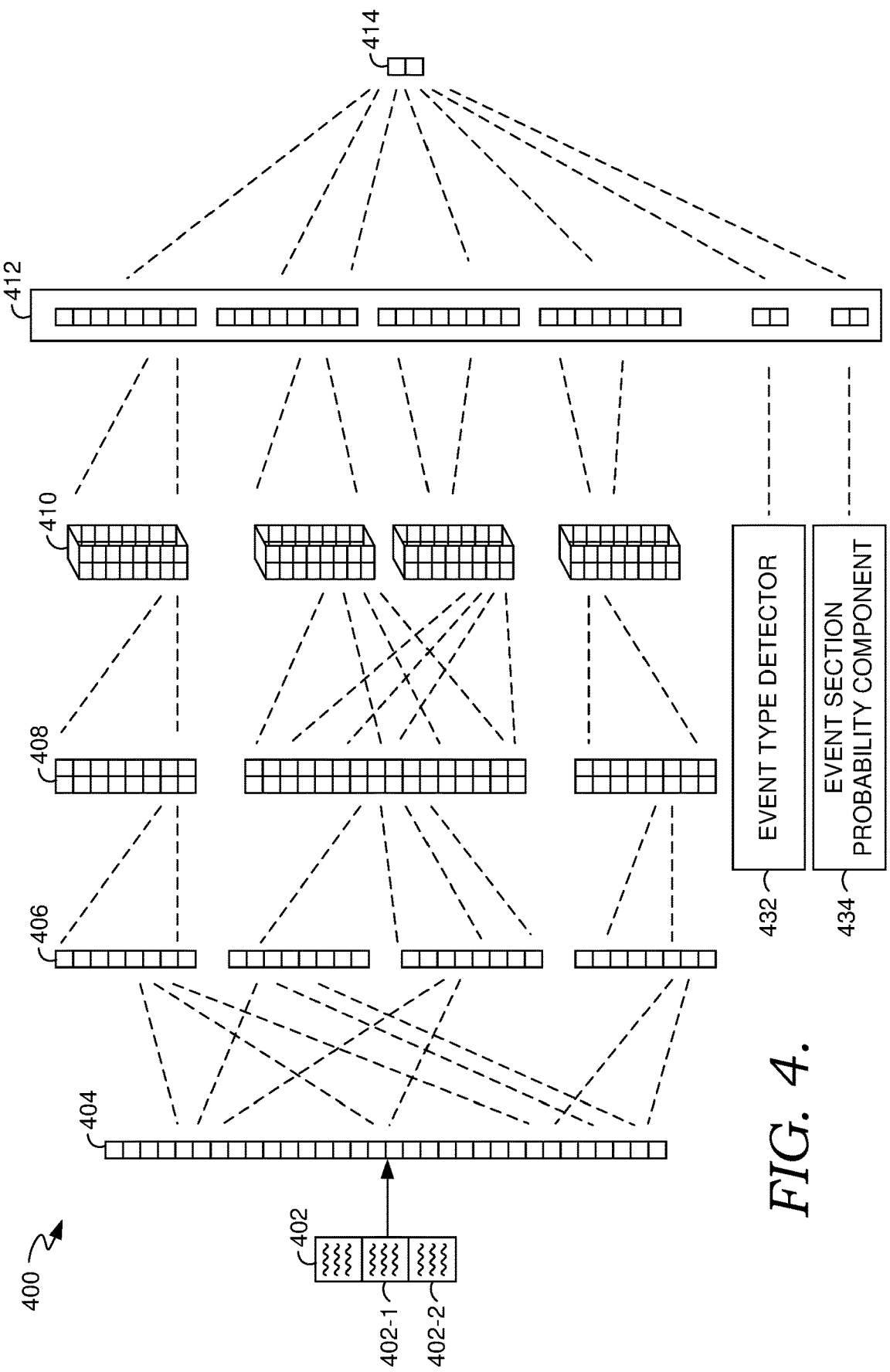
FIG. 4 depicts a schematic diagram of an example model flow for determining one or more action items, according to an embodiment of this disclosure.

Turning now to FIG. 4, a schematic diagram of an example model flow 400 for determining one or more action items, according to some embodiments, is illustrated. In some embodiments, the model flow 400 is used by one or more components of FIG. 2 and/or FIG. 3. The model flow includes an input layer 404, various intermediate or hidden layers 406, 408, and 410, and an output layer 412 to perform classification 414 indicative of whether character sequences are action items or not action items. The transcript 402 is a written or audio content that corresponds to an entire body of utterances or natural language speech that occurred within an event. For example, the transcript 402 can include all of the dialogue that occurred during a meeting between participants including questions, commands or action items, pauses, sneezes, coughs, laughing, explanations, other sounds, and the like. The flow 400 takes as input at least a portion of the transcript 402, such as individual character sequences 402-1 (e.g., 3 ordered sentences that occur in time one right after another). In some embodiments, the layer 404 ingests the entire transcript 402 as input at a single time instance. Alternatively or additionally, the layer 404 ingests portions of the transcript 402 at different time instances (e.g., in near-real-time as each utterance or participant speech occurs). For example, the first set of character sequences 402-1 may be ingested at a first time, and the second set of character sequences 402-2 are ingested at a second time subsequent to the first time until all character sequences are ingested of the transcript 402.

In some embodiments, the character sequences (e.g., 402-1) include both the context before a sentence or sentence fragment and the context after the same sentence or sentence fragment, and/or action item candidates (e.g., as determined by the action item candidate determiner 321). For example, a portion of the transcript may read " . . . . I'm feeling like we can accomplish task X. So John do task X by Friday. That should give us enough time to accomplish task Y." Accordingly, "so John do task X by Friday" may be the action item candidate, and "I'm feeling like we can accomplish task X" and "That should give us enough time to accomplish task Y" are the contexts of the action item candidate. In some embodiments, the input layer 404 (or any of the layers 406, 408, 410, and/or 412) includes artificial input neurons that are weighted or not weighted to take on some or each of the information within the transcript 402.

The layer 406 receives the output of the layer 404 (a character sequence with its context), and an identification is made (e.g., via the action item candidate identifier 262) of the action item candidate, the particular character sequence (e.g., a sentence), and the backward context (e.g., the context before the particular character sequence) and forward context (e.g., the context after the particular character sequence). In some embodiments, the layer 408 takes this as input and converts the information to vectors or determines semantic similarity between the sentences. In some embodiments, the layer 408 is or includes a word embedding vector model, such as WORD2VEC or GloVe. In these embodiments, the input to layer 408 is a sequence of text in natural language (the character sequences, action item candidates, the forward and backward context), and the layer 408 causes the natural language text to be converted to vectors (e.g., real numbers) and mapped in vector space in preparation for a machine learning model to make predictions. For example, WORD2VEC word embedding vector models can be used to map each input into a set of vectors. Then all of the vectors representing, for example, the portion 402-1, are averaged to form a single vector representation in vector space, which is described in more detail herein. In this way, other machine learning models can take these vectors as input to make predictions.

In some embodiments, the word embedding vector model is a WORD2VEC model. A WORD2VEC model is a two-layer network model that runs one or more input vectors (e.g., which represent a message element) through a hidden layer (i.e., a column-row matrix) and a projection layer (e.g., a softmax classifier). WORD2VEC models predict target strings from source context words (i.e., via the Continuous Bag of Words (CBOW) algorithm) or inversely predict source-context words from target words (i.e., via the skip-gram algorithm).

In various instances, vectors are mapped in vector space according to their semantic similarity to other vectors that represent other text. In this way, for example, the input can be normalized or otherwise cleaned (e.g., by the cleaning component 316) to restructure text or action item candidates. In order to plot the input vectors in vector space, the model is trained using training data. In various embodiments, the training data includes a large corpus of unstructured data (e.g., documents, news articles, social media posts, news feeds, or blogs), semi-structured data, and/or structured data (e.g., database values). The training data can also be an input of the word embedding vector model. In some embodiments, the vector space represents a "pre-trained" embedding. A pre-trained embedding is a static model that is generated without feedback, retraining, or reference to the data sets being fed through it. For example, a user may download a static word embedding vector model from an online source, which is already trained and includes the vectors or data points already mapped in vector space according to semantic similarity between words. In other embodiments, the vector space represents a "retrained" or trained embedding. A retrained or trained word embedding model is an embedding that receives training feedback after it has received initial training session(s) and is optimized or generated for a specific data set. For example, after initial data points are plotted to the one or more word embedding vector model, some embodiments can "re-train" the word embedding vector model(s) a second time so that any vectors or words in a future data set are consistently mapped to its closest neighbor(s) or other word according to the policy implemented. In some embodiments, retraining includes issuing feedback to make sure the correct data point pairing is utilized.

In order to map each of the words to its contextually appropriate points in the vector space, training algorithms are utilized. For example, in some embodiments, the word embedding vector model is trained using the maximum likelihood (ML) principle to maximize probability of the next word $w_t$ (i.e., "target") given the previous words h (i.e., "history") in terms of a softmax function:

$$P(w_t | h) = \text{softmax}(\text{score}(w_t, h)) \quad \text{Equation 2}$$

$$\exp\{\text{score}(w_t, h)\} = \frac{}{\sum \text{word } w' \text{ in Vocab}^{\exp\{\text{score}(w',h)\}}}$$

Where score ($w_t$, h) computes the compatibility of word $w_t$ with the context h. The model is trained by maximizing its log-likelihood on the training set, that is maximizing.

$$J_{ML} = \log P(w_t | h) \quad \text{Equation 3}$$

$$= \text{score}(w_t, h) - \log\left(\sum \text{Word } w' \text{ in Vocab}^{\exp\{\text{score}(w', h)\}}\right)$$

This yields a properly normalized probabilistic model for language modeling. Each probability is computed and normalized using the score for all other words w' in the current context h at every training step. In some embodiments, some models, such as WORD2VEC, are trained using a binary classification objective, such as logistic regression, to discriminate the real target words $w_t$ from K noise words w" in the same context. Accordingly, instead of a softmax classifier, a noise classifier is used.

In some word embedding embodiments, the output of the training algorithms and/or actual data input is each of the positional words in the vector space, which shows groupings of words that are semantically similar. "Semantic similarity" is the semantic distance between two or more concepts (e.g., words in integer form). The "distance" between any two or more words in some embodiments is based on the similarity of their meaning and/or semantic content, as opposed to any syntax similarity. For example, "car" and "far" are syntactically similar but have two different definitions so they are not semantically similar.

In some embodiments, the layer 408 includes a one-hot encoding layer and coordinate layer to represent and map words in vector space. For example, the word "meeting" may be converted into a one-hot encoding vector representation [1,0,0,0,0]. This vector representation shows five values where each value corresponds to the ordered input elements in the input and whether the meeting element is TRUE or present. Because "meeting" is the word being run through the word embedding vector model, the integer 1 is used to indicate its representation. "Meeting" does not contain any of the other words, so the other vectors are represented as 0. Then, the output embedding vector representation may be coordinates or other values indicative of where the word should be plotted in vector space (e.g., [1,2]). This coordinate mapping is plotted in vector space based on semantic similarity to other words and/or averaging or otherwise combining the output embedding vectors for all of the words within the input, in some embodiments.

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. No similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. In another example, the cosine similarity between "man" and "king" and "woman" and "queen" are the same cosine distance, thus king in certain situations is semantically similar to queen given the inputs of man and woman.

After the input is run through the layer 408 (e.g., converted into vectors and mapped in vector space), the layer 410 filters or weights the input it receives. For example, the layer 410 can be or include a convolutional layer of a CNN and a rectified linear unit (Relu). Relu is a type of activation function that can be used by certain machine learning models, such as neural networks, particular CNNs. In some embodiments, Relu is represented as y=max(0, x).

In some embodiments, the event type detector 432 and the event section probability component 334 can use the layer 412 to make predictions. In some embodiments, the event type detector 432 is the same component as the event type detector 332 of FIG. 3 and/or is included in the action items classifier 264 of FIG. 2. For example, the component 432 can use a Naïve-Bayes model as described above to classify the particular event. In some embodiments, the event section probability component 434 is the same component as the event section probability component 334 of FIG. 3 and/or is included in the action items classifier 264 of FIG. 2. For example, this component can map, in memory, the sections as likely or not likely to be action items.

In some embodiments, the layer 412 is the final prediction layer before a classification 414 is made concerning whether or not an action item candidate is an action item. In some embodiments, the layer 412 is a global max pooling layer or similar layer that takes a summed vector of a plurality of values at layer 410 and computes or outputs a single max value. In an illustrative example, regarding the event type detector 432, for each of the character sequences 402-1, 402-2, and the rest of the transcript 402, a vectored value may be generated indicative of whether the probability or score of being a certain event, such as a broadcast. In some embodiments, the layer 412 replaces or is otherwise used instead of a fully connected layer of a CNN. Accordingly, a single feature map for a corresponding category or label can be generated. Instead of adding fully connected layers on top of feature maps, the average of each feature map can be computed and the resulting vector can be fed directly into a softmax layer (e.g., the output 414).

The output 414 is a classification estimate or other prediction indicative of predicting whether character sequences or action item candidates are action items or not. In some embodiments, the output 414 is a softmax layer (e.g., as described above). A softmax layer is a type of squashing function, which limits the output of the function into a range of 0 to 1, where the closer the value is to 1, the greater confidence or higher probability that input falls within a certain classification and vice versa. Softmax layers can also be multi-class sigmoids, which means they can be used in determining probability of multiple classes at once. Softmax layers typically have the same quantity of nodes or neurons as the output layer (e.g., the layer 410).

Figure 5:
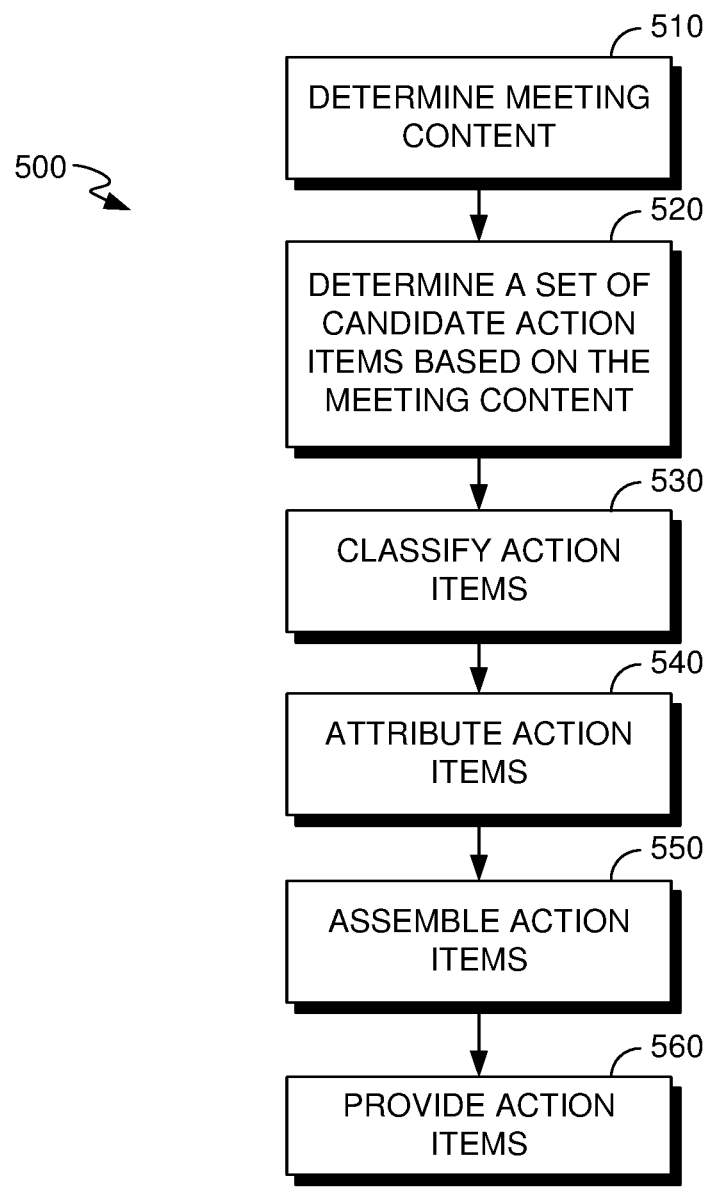
FIG. 5 depicts a process for determining and providing personalized action items from a meeting, in accordance within an embodiment of this disclosure.

Turning now to FIG. 5, which depicts a process 500 for determining and providing personalized action items from a meeting, in accordance within embodiments of this disclosure. Process 500 (and/or any of the functionality described herein may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 500 or any other functionality described herein. In some embodiments, some or each of blocks 510 through 560 may be automated or otherwise occur in a non-manual (e.g., no affirmative user device requests) fashion, which improves existing technologies, as described above.

Per block 510, meeting content is determined (e.g., by the meeting monitor 250). For example, the meeting activity monitor 252 can use one or more sensors or other components to monitor chats, presented context, or portions of a transcript. The contextual information extractor/determiner 254 can determine the contextual information of an event, such as who is present or invited to a meeting, the topic of the meeting, location of the meeting, or other context or character sequences within a transcript or meeting content itself. Then the meeting content assembler 256 can generate an enriched meeting-activity timeline, such as tags or structured data that includes a timeline of each conversation and a timestamp indicating when the conversation started/ stopped. In certain embodiments of block 510, content is determined from a meeting, which may be determined by monitoring the meeting receive information about the meeting, such as transcript information, or other information about the meeting such as the attendees, meeting topic, and/or related contextual information. In some embodiments, block 510 comprises monitoring a meeting to determine a set of meeting content. In particular, in one embodiment, a meeting monitor may receive indications of each user input in a chat or other online forum, which is indicative of a live meeting.

Per block 520, a set of action item candidates are determined (e.g., by the action item candidate identifier 262). Embodiments of step 520 determine a set of candidate action item candidates based on meeting content information determined in step 510. For example, based on the conversation and contextual information of a meeting, a set of possible action items may be determined. Some embodiments of step 520 may be performed as described in connection with action item candidate identifier 262 (FIG. 2). In some embodiments of step 530, the meeting content first may be clarified, such as described in connection to meeting content clarifier 261 of FIG. 2. Additional details of step 520 are described in connection to action item generator 260 in FIG. 2.

Per block 530, candidate action items determined at block 520 are classified. For example, a CNN or other machine learning model may be used to classify whether the action item candidates are action items or are not action items, which may both be labels, for example, in a classification model. In this way action item candidates can be ruled out or actually become action items. The classification can be based on the meeting content or other contextual information in some embodiments, such as when a model learns contextual information that a user always indicates that a particular phrase is an action item. Accordingly, when the phrase is stated, it can be classified with high probability that it is an action item. Embodiments of step 530 may be performed as described in connection with action item candidate classifier 264 (FIG. 2). Additional details of step 530 are described in connection with action item generator 260 in FIG. 2.

Per block 540, the action items are attributed. Embodiments of step 540 attribute one or more of the candidate action items to a specific individual, such as a meeting attendee. For example, action items can be attributed to meeting participants who are responsible for completing the action item or meeting participants who are responsible for stating the action item. Embodiments of step 540 may be performed as described in connection with action item attributor 266 (FIG. 2). Additional details of step 540 are described in connection to action item generator 260 in FIG. 2.

Per block 550, the action items are assembled. Embodiments of step 550 assemble the action items by relevant action-item context (e.g., due date of action item, importance of action item, and the like), contextual information (e.g., character sequences in a transcript other than action items), and the like. For example, files that were discussed in the meeting, transcript portions of the meeting close to the action items, or other information can be assembled. Embodiments of step 550 may be performed as described in connection with action item assembler 269 (FIG. 2). Additional details of step 550 are described in connection to action item assembler 269 in FIG. 2.

Embodiments of block 560 provide the action items assembled in step 550. Embodiments of block 560 may provide the action items intended to be performed by a specific person to that person. The action items may also include contextual information such as due dates, and/or other related context such as background information, explanatory information, supervisory or responsibility information about who or whom the action item is to be prepared for or who is supervising the performance of the action item, which may be determined or extracted during the meeting (or from previous related meetings). In this way, the action items may be personalized to that specific person. In some embodiments, block 560 also may provide a set of action items to a supervisor or to a person for whom the action item is being performed. In this way, embodiments of the technologies described herein provide a technological means to monitor and ensure accountability. In some instances, only the strongest/highest confidence action items are provided or displayed, while the other action items are not provided. In some embodiments, users can view more action items including those with less confidence, or users may configure settings (via user preferences 244) a threshold for how many action items to be provided or how high of confidence about the action item is used to determine which items to provide. In some embodiments of block 560, prior to providing the action items, the action items may be clarified such as described in connection to action item clarifier 268 (FIG. 2). For example, redundant or repetitively state action items may be removed (deduped), action items can be consolidated (e.g., into a viewable list without other content of a meeting), and action item consistency can be verified.

Some embodiments of block 560 may provide a personalized set of action items to the users responsible for completing and/or stating those action items via a communication message, such as email or within an application, such as a communications application, calendar application, task list/to-do application, or an online meeting application. Embodiments of block 560 may be performed as described in connection with action item assembler 266 (FIG. 2). Additional details of step 540 are described in connection to action item generator 260 in FIG. 2.

Figure 6:
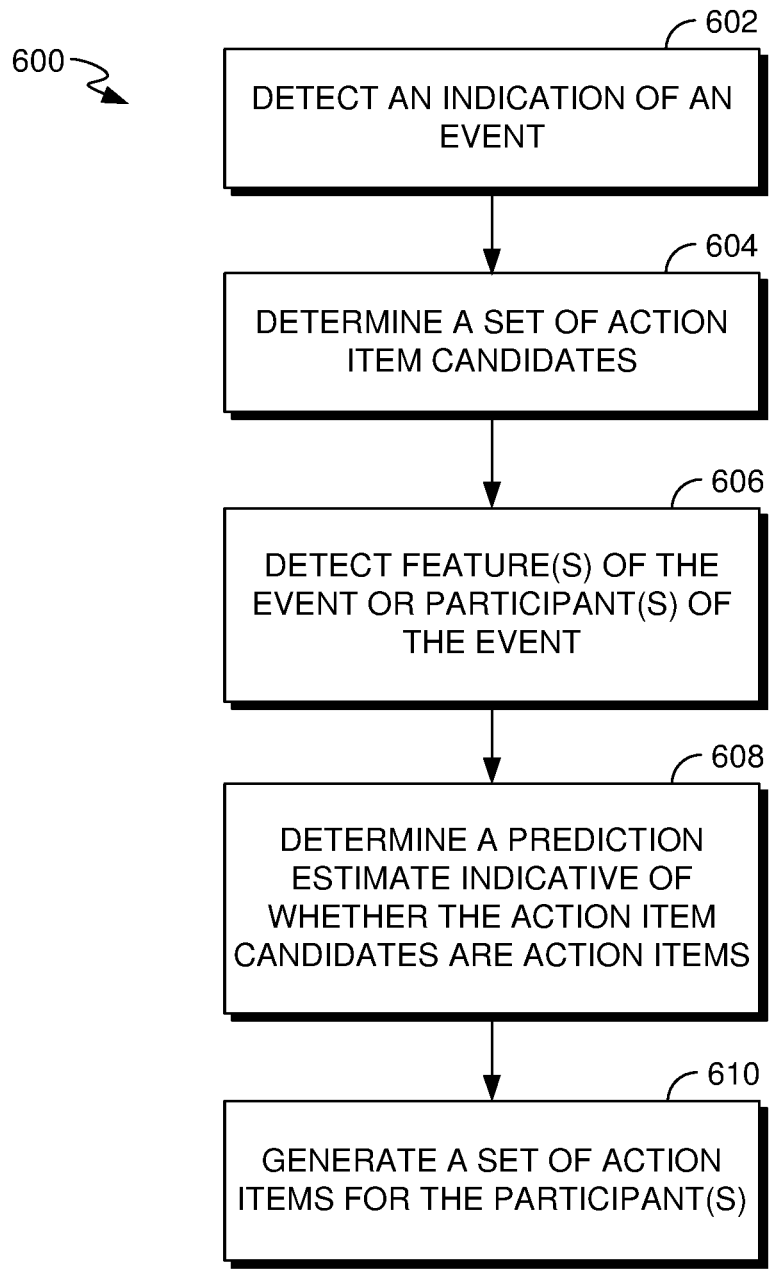
FIG. 6 is a flow diagram showing a method for generating enriched events in accordance with an embodiment of this disclosure.

Turning now to FIG. 6, an example process 600 for determining whether character sequences of an event are action items, according to some embodiments. The process 600 (and/or any of the functionality described herein may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 600 or any other functionality described herein. In some embodiments, some or each of blocks 602, 604, 606, and/or 608 may be automated or otherwise occur in a non-manual (e.g., no affirmative user device requests) fashion, which improves existing technologies, as described above.

Per block 602, an indication of an event or one or more portions of an event are detected (e.g., by the meeting monitor 250 or the natural language sequence normalizer 312). The event includes natural language content discussed in the meeting event by one or more event participants or attendees. For example, the event can be a meeting of 3 participants and a portion of the meeting event that can be detected is the opening remarks by a first participant. In some embodiments, one or more user devices, sensors, or other devices are queried (e.g., by the meeting monitor 250) to determine that a meeting has or will begin, which may be an indication of an event. Accordingly, when a meeting participant starts engaging in discussion or when a time is identified at which point a meeting will begin, this indication of the event can be detected in near-real-time. For example, using contextual data from calendars, texts, or other data, it can be determined that a meeting will start at 4 p.m. Accordingly, the meeting monitor 250 can, for example, cause a control signal to be sent to a microphone device in proximity of the meeting location or online to become activated, at which point a meeting event is detected or will be detected in response to receiving the first utterances of meeting participants of a meeting. In some embodiments, detecting an "indication" of an event includes detecting when it is to start. Alternatively or additionally, detecting an indication of an event can include detecting at least a portion of the event or transcription of the event (e.g., detecting when a person makes an utterance to start the meeting).

In some embodiments, an entire transcript or copy of the event can be detected when the event is completed. For example, a device may record an entire meeting event and an administrator can upload the meeting event on a computing device, which causes a natural language text to be outputted (e.g., via speech-to-text), at which point the transcript can be detected. For illustration purposes and examples described below, an entire example transcript of a meeting event can be the following: " . . . how was your weekend. Great . . . we went fishing. Looks like Bob is arriving. Ok, let's begin, as you recall we talked about sales figures last meeting. We did ok this quarter but we need to do more. John, how did your business unit do? We did fair, with a profit of X. We definitely need to improve. Set a goal for [telephone rings, pause] set a goal for X amount in profit next quarter. Ok. Jake, did we ever call the event coordinator? Yes, but I have not got a hold of him. Okay, give him a text this time. Sometimes he doesn't answer his phone. Actually, I'll text him right now. Jake, before I forget, my daughter also needs to be picked up from school. Can you do that? Yes."

Per block 604, a set of action item candidates can be determined (e.g., by the action item generator 260 or the action item candidate determiner 321). Some embodiments can compute a set of action item candidates from a plurality of character sequences associated with the event. An action item can be a task indicated in the meeting event that is requested to be completed to further a particular goal or purpose associated with the meeting event. In some embodiments, block 604 includes tokenizing, via natural language processing, a transcript of the meeting event to clean or otherwise provide insight for prediction action items (e.g., by the natural language sequence normalizer 312). Tokenizing can include generating Part-of-Speech tags for the plurality of character sequences. For example, using the example transcript above, each word can be parsed and tagged with POS identifiers (e.g., "how [interrogative pronoun] was [verb] your [pronoun] weekend [noun]." In this way, syntax or other phrase structure can be used to identify action item candidates. For example, the typical syntax of an English imperative sentence uses a base verb at the beginning of the sentence with no subject. Accordingly, in the example transcript, the only sentences or phrases that take on a similar structure may be "Okay, give him a text this time" and "set a goal for [telephone rings, pause] set a goal for X amount in profit next quarter," "Actually, I'll text him right now. Jake, before I forget, my daughter also needs to be picked up from school. Can you do that . . . " which may be all be identified as the candidates.

In some embodiments, block 604 additionally or alternatively includes excluding (e.g., by the candidate exclusion component 327) action item candidates that are likely to be completed during the meeting event and/or excluding action item candidates that are commands or requests that are unrelated to the meeting event. For example, in the example transcript, "actually, I'll text him right now" can be excluded because it is likely to be completed during the meeting. Also, "can you [pick up my daughter from school]" can also be excluded since it is unrelated to the meeting.

In some embodiments, block 604 additionally or alternatively includes excluding language from action item candidates that is repetitive or redundant (e.g., by the cleaning component 316). For example, using the example transcript above, "Set a goal for [telephone rings, pause] set a goal for X amount in profit next quarter" can be modified as "PERSON will try to sell X amount in profit next quarter" to remove "set a goal" since it was stated twice.

In some embodiments, block 604 includes processing character sequences of the transcript through a word embedding vector model or semantic model. The word embedding vector model changes natural language characters to numerical vectors that represent input into a machine learning model (e.g., as described with respect to FIG. 4). In this way, the vectors can act as input into a machine learning model. Semantic models, such as WORD2VEC can include restructuring the set of action item candidates by removing, adding, or replacing particular words. The restructuring is indicative of clarifying what an action item candidate is. In this way, language is cleaned or otherwise added, removed, or replaced based on semantic context. For example, using the example transcript, "Set a goal for [telephone rings, pause] set a goal for X amount in profit next quarter" can be modified as "PERSON will try to sell X amount in profit next quarter." This restructuring can be completed in various embodiments for all text (or only the identified action item candidates) of the example transcript described above to clean the text. As described above, in some embodiments, the restructuring is based on using a natural language processing component to identify POS tags and semantic context and restructuring the set of action items based at least in part on the POS tags and the semantic context.

Per block 606, one or more features (also known as attributes) of the event and/or participant(s) of the event are detected (e.g., by the meeting monitor 250 via the user-data collection component 210). For example, some or all of the data within the user profile 240, 340, and/or event profile 370 can be detected or any other data detected as described with reference to the meeting monitor 250. In an illustrative example, one or more user profile features in a group of features can be detected, such as participant preferences of the one or more event participants, participant role of each participant of the one or more event participants, and past behavior history of each participant of the one or more event participants. In some embodiments, past behavior history includes features of, for example, tendency to mention action items at a specific time or time window in an event and patterns in the way participants talk, as described above with respect to FIG. 3. In some embodiments, participant preferences include recreational, hobby, or other interests.

In some embodiments, event profile features can include one or more features in a group that includes, for example, name or topic of an event, location of the event, and event participant data, such as described with respect to FIG. 3. In some embodiments, the event participant data includes names and relationships between one or more participants at the event. In some embodiments, the relationships are indicative of a hierarchy of roles of the one or more participants within an organization, such as described, for example, with respect to the event profile 370.

Per block 608, a prediction estimate indicative of whether action item candidates is determined (e.g., by the action item generator 260 or the classification component 330). The prediction estimate can indicate whether a set of action item candidates are action items or not action items. In some embodiments, the prediction at block 608 is automatically generated based at least in part on the detecting of the one or more features/attributes of the meeting event and at least a portion of the one or more meeting participants (block 606). In some embodiments, based at least in part on the detecting of the one or more attributes of the event or the one or more event participants (e.g., via block 606), a classification estimate is generated (e.g., via a CNN machine learning model) that includes at least a first label and a second label. The first label is indicative of whether an action item candidate is an action item. The second label is indicative of whether an action item candidate is not an action item, such as described with respect to FIG. 4.

In some embodiments, block 608 may be preceded by or include determining, via a Naïve-Bayes model, a type or classification of the event such that the prediction estimate is further generated based at least in part on the determining of the type or classification of the event, as described, for example, with respect to the event type detector 332 of FIG. 3. In some embodiments, block 608 may be preceded by or include determining, via an HMM, whether the set of action item candidates have a low or high probability of being action items as described, for example, with respect to the event section probability component 334 or 434 of FIGS. 3 and/or 4. In some embodiments, the automatically generating of the prediction estimate includes using a CNN and is further based at least in part on content within an event transcript that is ordered before a respective action item candidate and after the respective action item candidate such as described, for example, with respect to the context (forward context and backward context) of FIG. 4. In some embodiments, the automatically generating of the prediction estimate includes using at least three probability models, such as described with respect to the Naïve-Bayes model, a CNN model, and the HMM model of the classification component 330 of FIG. 3. For example, block 608 can include or be preceded by determining, via a Naïve-Bayes model, a type or classification of the event such that the classification estimate is further generated based at least in part on the determining of the type or classification of the event (e.g., as described with respect to the event type detector 332 and the event section probability component 334).

In some embodiments, the prediction estimate or determination of the classification estimate is based at least in part on the one or more user profile features as described above with respect to block 606. For example, the classification can be based on participant preference of the one or more event participants, participant role of each participant of the one or more event participants, and/or past behavior history of each participant of the one or more event participants. For example, using the example transcript above, because "set a goal for X amount of profit next quarter" is determined to be Bob, a manager over both John and Jake, this statement is predicted to be an action item. However, if, for example, past user history shows that every time this was asked in the past, participants always had to set the goal before the meeting ends, then it may not be an action item.

In some embodiments, the determination of the prediction estimate at block 608 additionally or alternatively is based at least in part on one or more event profile features (e.g., within the event profile 370), such as name or topic of the event, location of the event, and event participant data. For example it can be determined that a meeting event includes the topic sales, and contextual data (e.g., as described with respect to the meeting monitor 250) reveals that the discussion about the "event coordinator" described in the example transcript was about a personal topic unrelated to the meeting. Accordingly, it can be predicted that the action item candidate of "Okay, give him a text this time" is not an action item based on meeting topic and contextual data.

At block 610, generate a set of action items for one or more meeting participants. Embodiments of block 610 generate a set of one or more action items. The action items may be for a particular meeting participant in that the particular participant is responsible for performing the action item(s) or seeing that they are completed. In some embodiments, action items can be generated for a user who is not necessarily present at the meeting. (This not-present user may be considered a participant because she is still participating in carrying out an action items from the meeting.)

In some embodiments of block 610, the set of action items are generated based at least in part on the prediction estimate of block 608. For example, if there is a high likelihood or a confidence level over a threshold, the action item can be provided to a user, such as via an application or computing service on a user device associated with the user. In some embodiments, the generation of action items can occur within or as part of a user interface or other presented data to a user device for a particular user. In this manner, the generated action items can be caused to be displayed (e.g., by presentation component 220) on a user device, such as via a user interface, which may be part of an application or service. In various embodiments, the output may include a displayed list of all predicted or likely action items. For example, using all of the examples and the example transcript above, the only action item candidate that has a threshold probability of being an action item may be "set a goal for X amount in profit next quarter." Accordingly, all of the other portions of the example transcript have been removed or otherwise excluded from becoming displayed or otherwise presented action items. In this way, the amount of content that is communicated, presented (e.g., displayed), or stored to devices can be reduced to action items. In various embodiments, the likely or predicted candidates can be attributed, sent, clarified, and/or transmitted to one or more computing applications or computing services associated with a user, and/or user devices associated with a user, such as, for example, described with respect to the action item attributor 266, the action items clarifier 268, the presentation component 220, the action items assembler 269, and/or as shown on user device 859 of FIG. 8. Conversely, the non-likely action items or candidates that are not predicted to be action items may not be attributed, sent, clarified, and/or transmitted to user devices, which may reduce computing resource consumption, such as memory, CPU, disk I/O and the like as described above.

Figure 7:
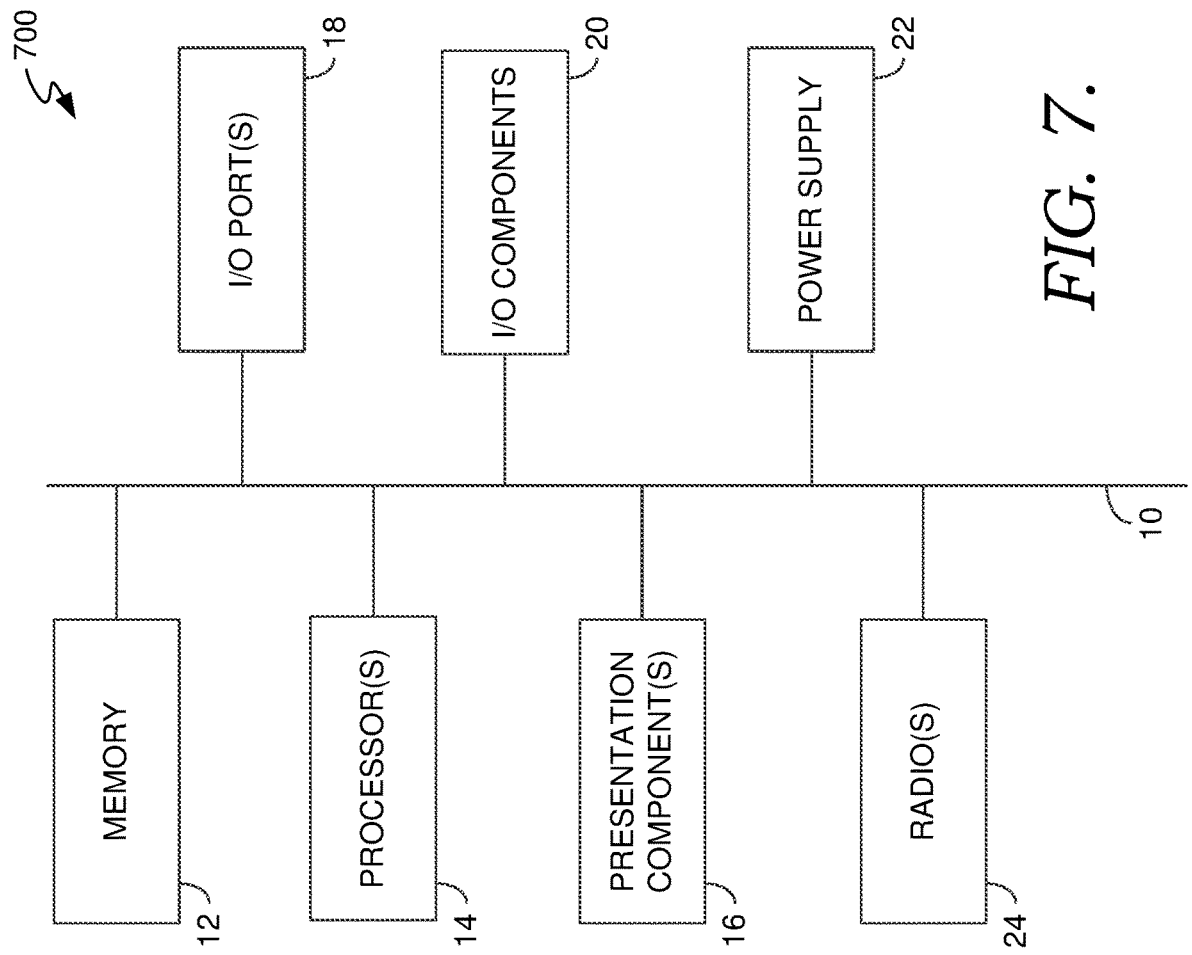
FIG. 7 is a block diagram of an exemplary computing environment suitable for use in implementing an embodiment of this disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 14 that read data from various entities such as memory 12 or I/O components 20. Presentation component(s) 16 presents data indications to a user or other device. In some implementations presentation component 220 (or 320) of system 200 may be embodied as a presentation component 16. Other examples of presentation components may include a display device, speaker, printing component, vibrating component, and the like.

The I/O ports 18 allow computing device 700 to be logically coupled to other devices, including I/O components 620, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 24 (or similar wireless communication components). The radio 24 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computerized system comprising: one or more processors; and computer storage memory having computer-executable instructions stored thereon which, when executed by the one or more processors, implement a method comprising: detecting an indication of a meeting event, the meeting event includes natural language content provided in the meeting event by one or more meeting participants; computing or determining a set of action item candidates from a plurality of character sequences associated with the natural language content, wherein an action item is a task indicated in the meeting event that is requested to be completed to further a particular goal or purpose associated with the meeting event; detecting one or more features of the meeting event and attributes of at least a portion of the one or more meeting participants; based at least in part on the detecting of the one or more features of the meeting event and attributes of at least a portion of the one or more meeting participants, automatically generating a prediction estimate that indicates whether the set of action item candidates are action items or not action items; and based at least in part on the automatically generating of the prediction estimate, generating a set of action items and presenting the set of action items to one or more user devices associated with the one or more participants.

Clause 2. The system of clause 1, wherein the method includes tokenizing, via natural language processing, a transcript of the meeting event, wherein the tokenizing includes generating Part-of-Speech tags for the plurality of character sequences.

Clause 3. The system of clause 1, the method further comprising excluding action item candidates that are likely to be completed during the meeting event and excluding action item candidates that are commands or requests that are unrelated to the meeting event.

Clause 4. The system of clause 1, the method further comprising determining, via a Naïve-Bayes model, a type or classification of the meeting event, and wherein the prediction estimate is further generated based at least in part on the determining of the type or classification of the meeting event.

Clause 5. The system of clause 1, further comprising determining, via a Hidden Markov Model, whether the set of action item candidates have a low or high probability of being an action item.

Clause 6. The system of clause 1, wherein the automatically generating of the prediction estimate includes using a Convolutional Neural Network and is further based at least in part on content within a transcript of the meeting event that is ordered before a respective action item candidate and after the respective action item candidate.

Clause 7. The system of clause 1, wherein the automatically generating of the prediction estimate includes using at least three probability models.

Clause 8. A computer-implemented method comprising: detecting at least a transcript portion of an event, the transcript includes natural language content discussed in the event by one or more event participants; determining a set of action item candidates from a plurality of character sequences within the transcript, wherein an action item is a task indicated in the event that is requested to be completed to further a particular goal or purpose associated with the event; detecting one or more attributes of the event or the one or more event participants; and based at least in part on the detecting of the one or more attributes of the event or the one or more event participants, generating, via a machine learning model, a classification estimate that includes at least a first label and a second label, the first label is indicative whether an action item candidate is an action item, the second label is indicative of whether an action item candidate is not an action item.

Clause 9. The method of clause 8, further comprising excluding language from action item candidates that is repetitive or redundant.

Clause 10. The method of clause 8, wherein the generating of the classification estimate is based at least in part on one or more user profile features in a group of features consisting of: participant preferences of the one or more event participants, participant role of each participant of the one or more event participants, and past behavior history of each participant of the one or more event participants.

Clause 11. The method of clause 10, wherein the past behavior history includes tendency to mention action items at a specific time or time window in an event and patterns in the way participants talk.

Clause 12. The method of clause 10, wherein the participant preferences include recreational, hobby, or other interests, and wherein the generating of the classification estimate is further based on the recreational, hobby, or other interests of the one or more event participants.

Clause 13. The method of clause 8, further comprising processing the plurality of character sequences through a word embedding vector model that changes natural language characters to numerical vectors, the numerical vectors represent input into the machine learning model.

Clause 14. The method of clause 8, further comprising determining, via a Naïve-Bayes model, a type or classification of the event, and wherein the classification estimate is further generated based at least in part on the determining of the type or classification of the event.

Clause 15. One or more computer storage media having computer-executable instructions embodied thereon that, when executed, by one or more processors, cause the one or more processors to perform a method, the method comprising: determining meeting content, the meeting content includes natural language content provided in a meeting by one or more meeting participants; determining a set of action item candidates based on the meeting content; classifying the set of action item candidates as action items or not action items; attributing the classified action items to a set of meeting participants of the one or more meeting participants that is responsible for completing the classified action items or a set of meeting participants that stated the classified action items; assembling the classified action items based at least in part on at least one of: the meeting content and contextual information; and provide the assembled classified action items to one or more user devices associated with the one or more meeting participants.

Clause 16. The computer storage media of clause 15, the method further comprising restructuring the set of action item candidates by removing, adding, or replacing particular words, the restructuring is indicative of clarifying what the action item candidate is.

Clause 17. The computer storage media of clause 15, wherein the restructuring is based on using a natural language processing component to identify Part-Of-Speech tags and semantic context and restructuring the set of action items based at least in part on the Part-Of-Speech tags and the semantic context.

Clause 18. The computer storage media of clause 15, wherein the attributing is based at least in part on one or more event profile features in a group of features consisting of: name or topic of the event, location of the event, and event participant data.

Clause 19. The computer storage media of clause 18, wherein the event participant data includes names and relationships between the one or more participants at the event, wherein the relationships are indicative of a hierarchy of roles of the one or more participants within an organization.

Clause 20. The computer storage media of clause 15, the method further comprising tokenizing a transcript of the meeting content and responsively generating Part-of-Speech tags for the plurality of character sequences.

What is claimed is:

1. A computerized system comprising:
one or more processors; and
computer storage memory having computer-executable instructions stored thereon which, when executed by the one or more processors, implement a method comprising:
determining a set of action item candidates from a natural language content in a transcript of content spoken during a meeting event by one or more meeting participants, wherein an individual action item candidate from the set of action item candidates includes a textual description of a task to be completed;
identifying a specific participant who spoke the natural language content through machine analysis of a meeting feature;
automatically generating a restructured action item candidate by restructuring, via a model, the textual description by removing, adding, or replacing particular words in the textual description, wherein the model uses the specific participant as an input to generate the restructured action item candidate;
detecting one or more features of the one or more meeting participants;
providing the one or more features and the restructured action item candidate as input to a machine learning model;
automatically generating a prediction estimate, by the machine-learning model processing the input, that indicates whether the restructured action item candidate is an action item or not an action item; and
based at least in part on the prediction estimate indicating that the restructured action item candidate is an action item, presenting the restructured action item candidate to one or more user devices associated with the one or more meeting participants.

2. The system of claim 1, wherein the method includes generating a set of action items, including the restructured action item candidate, with above a threshold prediction estimate.

3. The system of claim 2, wherein the determining of the set of action item candidates includes excluding action item candidates that are likely to be completed during the meeting event and excluding action item candidates that are commands or requests that are unrelated to the meeting event.

4. The system of claim 1, the method further comprising receiving a trained prediction model and generating the machine-learning model by re-training the trained prediction model using historical meeting data associated with one or more of the meeting participants.

5. The system of claim 1, wherein the machine learning model is a Hidden Markov Model.

6. The system of claim 1, wherein the machine learning model is Convolutional Neural Network and is further based at least in part on content within a transcript of the meeting event that is ordered before a respective action item candidate and after the respective action item candidate.

7. The system of claim 1, wherein the automatically generating of the prediction estimate includes using at least three different types of probability models.

8. A computer-implemented method comprising:
detecting a transcript that includes natural language content spoken during an event by an event participant;
tokenizing, via a natural language processing (NLP) component, the natural language content;
identifying the event participant who spoke the natural language content through machine analysis of a meeting feature;
responsively generating one or more tags for a plurality of character sequences of the natural language content;
determining a set of action item candidates from the plurality of character sequences within the transcript, wherein an action item is a task indicated in the natural language content that is requested to be completed;
in response to the determining, generating a set of restructured action item candidates by automatically restructuring, via a model, the set of action item candidates by removing, adding, or replacing p articular words from the set of action item candidates, the restructuring is indicative of clarifying what the set of action item candidates are, wherein the model uses the event participant as an input to generate the restructured action item candidate;

detecting one or more attributes of the event participant;

training a machine learning model to exclude action items that describe tasks completed in the event;

providing the one or more attributes and the set of restructured action item candidates as input to the machine-learning model;

generating, via the machine-learning model processing the input, a classification estimate that indicates whether a restructured action item candidate is an action item;

generating a set of action items from the set of restructured action item candidates that are associated with a classification estimate above a threshold; and presenting the set of action items to one or more user devices associated with the event participant.

9. The method of claim 8, further comprising excluding language from action item candidates that is repetitive or redundant.

10. The method of claim 8, wherein the generating of the classification estimate is based at least in part on user profile features of: participant preferences of the one or more event participants, participant role of each participant of the one or more event participants, and past behavior history of each participant of the one or more event participants.

11. The method of claim 10, wherein the past behavior history includes tendency to mention action items at a specific time or time window during previous events and patterns in the way participants talk.

12. The method of claim 10, wherein the participant preferences include recreational, hobby, or other interests, and wherein the generating of the classification estimate is further based on the recreational, hobby, or other interests of the one or more event participants.

13. The method of claim 8, further comprising processing the plurality of character sequences through a word embedding vector model that changes natural language characters to numerical vectors, the numerical vectors represent input into the machine learning model.

14. The method of claim 8, further comprising receiving a trained prediction model and generating the machine learning model by re-training the trained prediction model using historical event data associated with one or more of the event participants.

15. One or more computer storage media having computer-executable instructions embodied thereon that, when executed, by one or more processors, cause the one or more processors to perform a method, the method comprising:

determining a meeting content, wherein the meeting content includes natural language content spoken in a meeting by one or more meeting participants;

tokenizing, via a natural language processing (NLP) component, a transcript of the meeting content;

responsively generating one or more tags for a plurality of character sequences of the natural language content;

associating a participant with one or more of the plurality of character sequences through machine analysis of a meeting feature;

in response to the tokenizing, determining a set of action item candidates based on the plurality of character sequences and the participant associated with one or more of the plurality of character sequences;

classifying, using a machine-learning model, the set of action item candidates as action items or not action items, wherein the classifying is based on comments made by the participant in past meetings;

attributing the classified action items to a set of meeting participants of the one or more meeting participants that is responsible for completing the classified action items;

assembling the classified action items based at least in part on the meeting content, the attributing, and contextual information; and based on the attributing, transmitting the assembled classified action items to one or more user devices associated with the set of meeting participants and exclude from transmitting, to the one or more user devices, any other portion of the transcript of the meeting content.

16. The computer storage media of claim 15, the method further comprising restructuring the set of action item candidates by removing, adding, or replacing particular words, the restructuring is indicative of clarifying what the action item candidate is.

17. The computer storage media of claim 15, wherein the restructuring is based on using a natural language processing component to identify Part-Of-Speech tags and semantic context and restructuring the set of action items based at least in part on the Part-Of-Speech tags and the semantic context.

18. The computer storage media of claim 15, wherein the attributing is based at least in part on one or more meeting profile features in a group of features consisting of: name or topic of the meeting, location of the meeting, and event participant data.

19. computer storage media of claim 18, wherein the event participant data includes names and relationships between one or more meeting participants at the meeting, wherein the relationships are indicative of a hierarchy of roles of the one or more meeting participants within an organization.

20. The computer storage media of claim 15, the method further comprising tokenizing a transcript of the meeting content and responsively generating Part-of-Speech tags for the plurality of character sequences.

* * * * *